United States Patent [19]
Nelsen

[11] Patent Number: 5,996,738
[45] Date of Patent: Dec. 7, 1999

[54] COLLAPSIBLE TREE STAND WITH ROTATING SEAT

[75] Inventor: David Robert Nelsen, Etowah, N.C.

[73] Assignee: David Nelson

[21] Appl. No.: 08/627,230

[22] Filed: Mar. 18, 1996

[51] Int. Cl.$^6$ .................................................. A01M 31/02
[52] U.S. Cl. .......................... 182/135; 182/134; 182/136; 182/187
[58] Field of Search ..................................... 182/133, 134, 182/135, 136, 187, 188; 248/218.4; 297/217.7, 331, 334, 335, 344.26, 380

[56] References Cited

U.S. PATENT DOCUMENTS 4,987,972  1/1991  Helms .................................. 182/134 X
5,482,137  1/1996  McNeill .............................. 182/136 X Primary Examiner—Leslie A. Braun
Assistant Examiner—Long Dinh Phan

[57] ABSTRACT

A portable tree climbing device with platform capable of supporting a user above ground level. The main climbing platform incorporates a secured seat frame assembly which can also assume a secured upright position or collapse flat relative the platform body. The seat frame secures a seat with a folding backrest which is capable of complete 360 degree rotation relative to the platform body. A tree stand comprised of a main climbing platform and climbing aid whose angle members can be secured in either the upright, working position or collapse both flat and in overall length while in the transporting position. A tree stand where the main angle members secure an upright position by the use of slidable, pivotally connected linkages and spring loaded detent pins. A tree stand which utilizes a ridged and formed tree encircling member which is telescopically secured to the main angle members. The tree encircling member incorporates uneven leg lengths to further ease setup and is adjustable depending on the girth of the tree to be climbed. The tree encircling member secures its position by the use of locking pins. A main climbing platform and climbing aid whose members remain fully contained and connected to their relative platforms in either the upright working position or the collapsed transporting positions. A treestand which utilizes the "sit & stand" method of vertical locomotion.

21 Claims, 22 Drawing Sheets

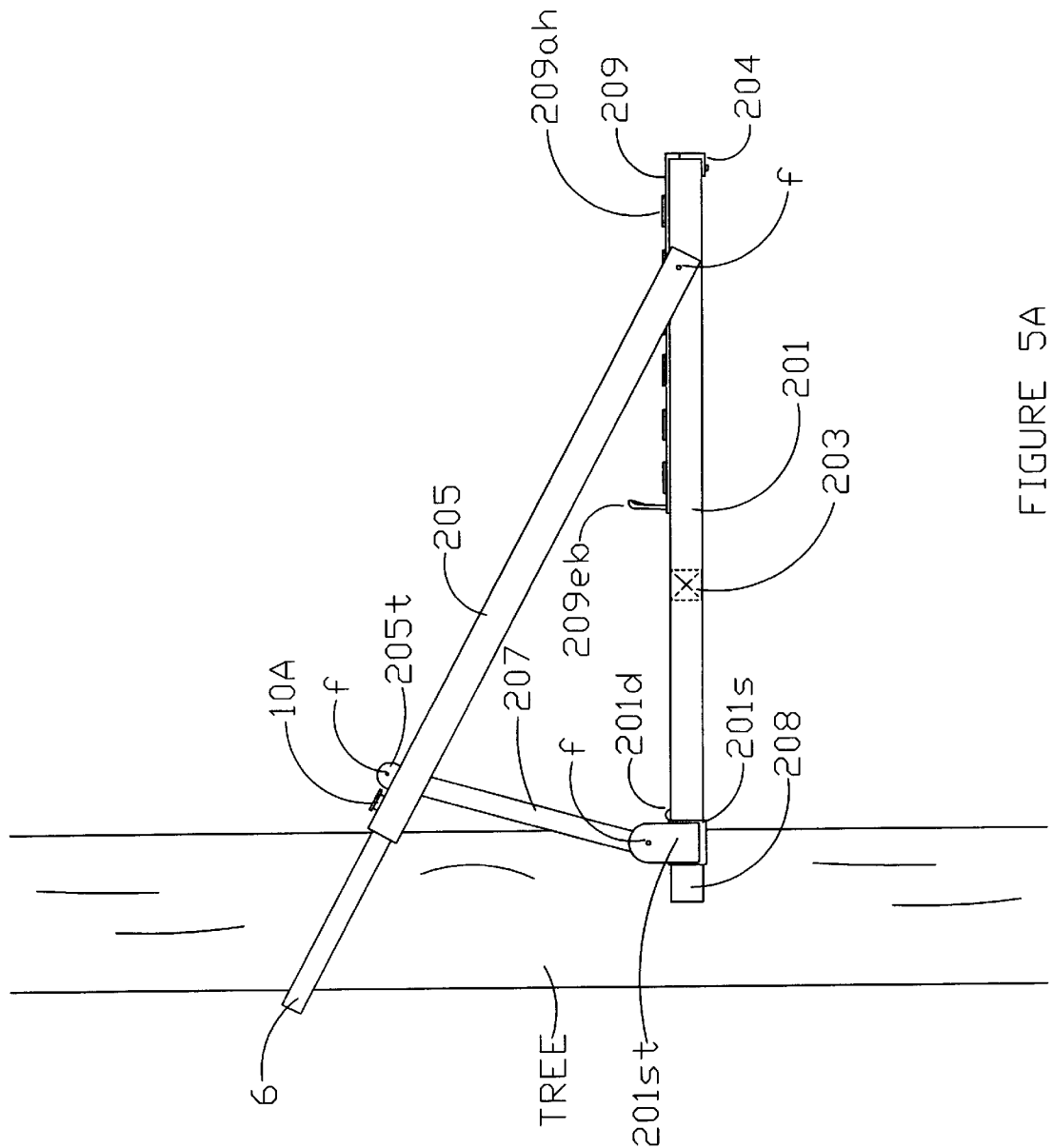

COLLAPSIBLE TREE STAND WITH ROTATING SEAT

BACKGROUND OF THE INVENTION

1. Field of the Invention

The present invention relates to tree or pole climbing devices. More specifically, the present invention relates to climbing tree stands.

2. Prior Art

Hunters and animal observers often climb trees to gain an elevated observation advantage when looking for particular game animals. To fill this need two part climbing tree stands exist in the prior art. The main platform of many of these tree stands also incorporate a collapsible seat in the platform design (See U.S. Pat. Nos. 4,802,552; Williams: U.S. Pat. No. 5,103,935; Amacker: U.S. Pat. No. 5,310,019; Paul). With each of these disclosed devises, the seat in the raised, working position rests or is secured to the tree itself for stability and platform utilization. The seat in the raised working position generally requires that the tree itself is used as a backrest for the operator. When in the seated position, the operator's field of view is generally restricted, away from the tree. Furthermore, these designs use a stationary, fixed position seat. The operator must shift him or herself from one side of the seat to the other to observe activity from behind or from either side of the fixed position seat. This required shifting of the body can be dangerous with the tree stand high above ground level.

Tree stand collapsibility also exists in the prior art. The collapsible angle members in the flat or collapsed position extend considerably past the platform frame of the tree stand, adding to the overall length of the collapsed tree stand (See U.S. Pat. No. 4,331,216; Amacker). This disclosed device compacts its structural members to a collapsed or flat configuration, however, does not collapse in overall length. Complete collapsibility in length and flatness is an asset to the operator when carrying the tree stand threw thick brush and uneven terrain.

Two part climbing tree stands use one of two methods of climbing; The stand and lift method or the sit and stand method. In the stand and lift method the operator secures his or her feet in a platform base and generally pulls him or herself up the tree by hanging on an overhead platform or climbing bar (See U.S. Pat. No. 5,265,780; Matthew et al.: U.S. Pat. No. 3,856,111; Baker: U.S. Pat. No. 5,310,019; Paul: U.S. Pat. No. 5,103,935; Amacker: U.S. Pat. No. 4,802,552; Williams). Many climbing tree stands use the stand and lift method of climbing because the lower platform base design does not allow for an opening where the operator can place his or her legs threw to utilize a foot climbing platform. This method of climbing, in addition to being more physically demanding, can unduly fatigue the operator which could impose a certain degree of safety risk with the operator elevated high above ground level. Most tree stands using the stand and lift climbing method also incorporate a raised seat which secures against the tree. This stationary seat configuration further restricts the operators field of view to that area generally in front of the seated operator. To successfully observe areas behind the seated operator, he or she must shift his or her body or physically stand up and turn around on the platform. These extra required movements by the operator could also impose further safety risks. The safer sit and stand method of tree climbing allows the operator to climb by merely alternating a repeated sit and stand posture. While allowing the operator to climb the tree with much less effort and fatigue and consequently in a safer manner, the tree stands using the sit and stand climbing method generally restrict the operator to a face the tree seating position, limiting his or her field of view as much as with the face away tree stands. Some sit and stand climbing tree stands have provided a means of allowing the operator to change the seating position to either a face to or away from the tree stand by incorporating a generally slidable seat (See U.S. Pat. No. 4,331,216; Amacker: U.S. Pat. No. 5,156,236; Gardner et al.). In order for the operator to change his or her seating position in these disclosed devices, he or she must first unsecure the slidable seat, stand up and step over or go under the seat base and resecure the seat when the base is pushed towards the tree. This tedious step must also be performed in reverse if the operator is to climb back down the tree. These disclosed devices require the operator to step over or under the seat platform which also imposes some safety risks because of the agility required to perform this operation and also because this operation is often done before and after daylight hours. While this slidable seat base allows the operator to choose his or her seating arrangement, his or her field of view is still generally restricted by the use of a stationary seat in addition to the seat arrangement committed to.

The use of an adjustable tree encircling angle or band exists in the prior art. In the tree stands which use a rigid angle, the angle is adjusted by securing a bolt and wing nut type fastener threw the angle ends and the desired holes in the angle arms (See U.S. Pat. Nos. 4,331,216; 5,090,504; 5,103,935; Amacker: U.S. Pat. No. 3,856,111; Baker: U.S. Pat. No. 5,310,019; Paul). Securing the angle encircling members by bolt and nut fasteners can be tedious, especially before and after daylight hours. Furthermore, bolts and nuts can easily become lost or work their way loose when transporting the tree stand or when actually climbing the tree. Tree stands using the tree encircling band generally telescope the band into a sleeve that secures the bands position using a spring loaded detents or pins (See U.S. Pat. No. 5,265,780; Matthews et al.: U.S. Pat. No. 4,890,694; Williams) helping to alleviate the problem of securing bolt and nut fasteners with the previously mentioned stands. However, the thin encircling bands have a relatively thin cross section and are more readily damaged by buckling or folding stresses, potentially effecting the safety and climbing ability of the stand. In addition, encircling members of both the band and the angle type are secured at their ends only by a single bolt or pin. If any one of the pins or bolts should fail, in both the band and angle type encircling members, this would cause these members to come free from the main platform body and could result in a potentially lethal condition for the operator. Furthermore, these stands lack an extra safety backup feature to compensate for pin or bolt shear failure.

Many tree stands use sharp or jagged tree encircling members (See U.S. Pat. No. 5,103,935; Amacker: U.S. Pat. No. 3,856,111; Baker). While these members act to more positively engage the stand with the tree, they also damage the tree's bark. The rubber sheathed tree encircling band helps to alleviate this problem, however lacks the rigidity of the thicker angular blades. Much of the need for a sharp tree encircling members and tree stand securing ropes (See U.S. Pat. No. 5,310,019; Paul: U.S. Pat. No. 4,802,552; Williams) arises because the users center of gravity is too close to the tree, effectively limiting the binding torque that secures the tree stand against the tree. This decreased torque decreases the tree stand stability and resulting safety.

Whatever the precise merits, features and advantages of the above cited references, none of them achieves or fulfills the purposes of the collapsible tree stand with a rotating seat of the present invention.

SUMMARY OF THE INVENTION

The principle object of the invention is to provide a rigid, safe, lightweight, easily portable climbing tree stand which easily collapses in both overall length and height while incorporating a seat which is capable of complete 360 degree rotation.

It is also an object of the present invention to provide a rotating seat with a rigid, sufficiently raised supporting base which is easily set up in either its raised working or collapsed transporting position.

Another object is to provide the operator with complete unimpeded rotating capability so that any desired field of view with respect to the tree can be realized both safely and quietly.

Still another object is to provide a rotating seat with a collapsible and rigid backrest.

A further object is to provide a comfortable seating arrangement, with generous leg room so that the operator can stay in the s ea ted position comfortably, for long periods of time.

It is also an object to provide the operator with the option of sitting in the raised rotating seat or standing on the standing platform.

An additional object is to provide a platform which has generous standing area while maintaining both rigidity and is free of undue noise when the operator moves or shifts his or her weight.

An additional object is to provide a platform which provides positive traction between the users feet, to reduce accidental slipping when the platform becomes wet.

Another object is to provide locking pins which secures both the telescoping compressive platform member and the tree encircling members, constructed so that said pins remain securely attached to the pin locking assembly in either the engaged or disengaged positions.

Another object is to provide locking pins which set up easily and provide a positive action in either the engaged or disengaged position.

An additional object is to provide a male telescoping tree encircling member that is offset in leg length so that operator can easily guide each leg of said member independently into female main angle members.

An additional object is to provide a rigid tree encircling member which remains secured to the tree stand and the tree if one of the locking pins should fail.

Still another object is to provide a foot climbing aid that is rigid, safe, lightweight, collapsible and offers the operator generous standing room.

It is a further object of the invention to provide a tree climbing stand which allows the operator to safely climb trees using the sit and stand method of tree climbing.

It is a further object of the invention to provide a tree climbing stand which can be used as either a conventional "face the tree" tree stand with the seat in the collapsed position, or with a seat with complete rotating ability when the seat is in the raised working position.

An additional object of the invention is to provide a tree climbing stand and climbing aid wherein all components of the tree climbing stand and climbing aid are and remain fully attached and contained to ensure ease of setup and prevent stand components from becoming lost.

The foregoing objects can be accomplished by providing a tree stand which collapses by releasing detent pins which allow the main angle frame members to slide both back toward and downward relative the main platform body. The contoured compressive tree member also collapses toward the main platform body when its locking pins are disengaged.

The seat support frame also collapses generally flat relative the platform body by simply releasing detents in the legs of the rear seat frame support member. Releasing said detents allows pivotally attached struts to disengage from a fixed position relative said rear support frame and allows pivotally attached struts to travel down the legs of said rear seat frame leg length via tubular slides. Front and rear seat support frames are pivotally attached at their ends to the frontal and central crossmembers respectfully. When said slides are in said disengaged position, said support frame collapses back toward rear of platform body. Said front support is also sufficiently reduced in width with respect to said rear support frame so that said frontal member can completely lay flat and "nest" into said rear member. Said support frames having a rotatably secured tubular lengths along said support members generally center, unbent region. Said tubular lengths are attached to lower seat platform at said lower platforms frontal and rear edges. Said seat and seat frame assembly is secured in the upright working position by simply pulling said seat assembly up and towards front of said stand and allowing said detents to engage into apertures in said tubular slides.

Independent plates secured to both the seat and the seat frame allow the seat to rotate 360 degrees about a spaced nut and bolt pivot. The seat and seat frame are located near the midpoint of erected stand to allow operator to rotate unimpeded, without any undue obstruction from the tree. Said seat location also serves to increase the binding torque and resulting stability of the tree stand with respect to the tree.

Platform size is generous to allow the operator to either sit with his or her legs comfortably extended or to stand with comfortable turning room. Platform size does not readily affect compactability because of telescoping feature of contoured compressive tree member.

Locking pins are grooved to mate with spring loaded ball bearing in locking pin bushing. This configuration latches pin in either the up/disengaged or down/engaged positions. The pin is contour grooved so that the pin in the disengaged position can not become free of the locking pin bushing.

The tree encircling member leg lengths are slightly offset in length so that the operator can concentrate on inserting one leg at a time into the main angle members. After initially inserting the legs of the tree encircling member into the female angle members, the operator can easily telescope the encircling member to the correct set up position based on the girth of the tree. The tree encircling member is also constructed of a rigid member and telescoped into main angle members to help ensure that the encircling member retains its secured position with the tree stand even if one of the locking pins should fail.

The standing climber unit collapses to a flat carrying position by releasing detents which allow the slides and the pivotally attached struts to collapse flat towards the main climber platform.

The operator can easily sit facing the tree with the seat in the collapsed position and with his or her legs hanging threw the open area between the compressive member and the collapsed seat. This sitting configuration allows the operator to climb using the sit and stand method usually reserved for climbing tree stands with face the tree stationary platform level seats.

These and further objects and advantages of the present invention will become more apparent upon reference to the description of the preferred embodiment and the claims.

BRIEF DESCRIPTION OF THE DRAWING FIGURES

Figure 2A:
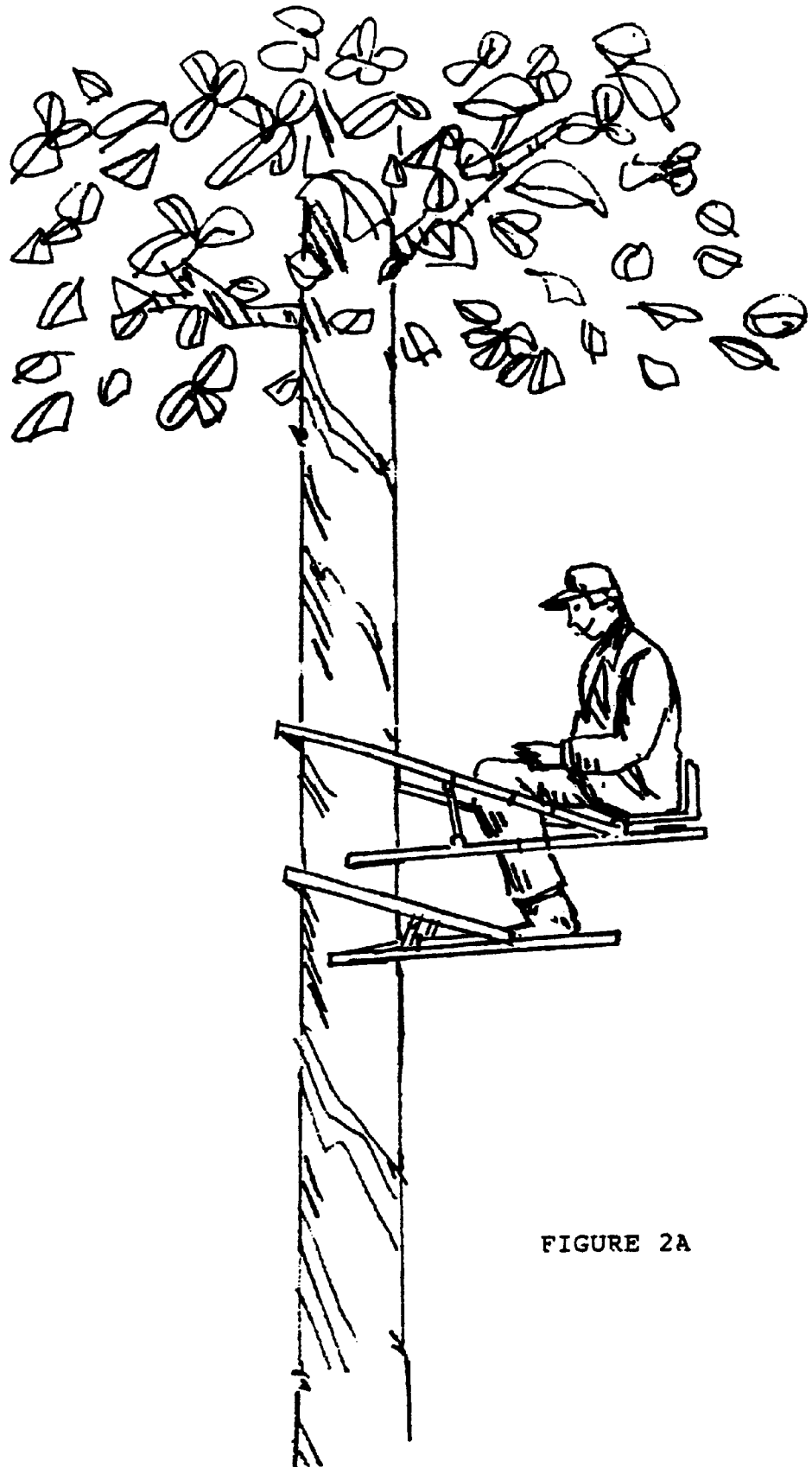
FIGS. 2A & 2B are perspective views showing the "Sit and Stand" method of tree climbing.

FIG. 2A also illustrates the hunter using the stand as a conventional "face the tree" tree stand with the seat in the flat, collapsed position.

Figure 3A:

FIG. 3A shows the hunter shooting a bow & arrow while sitting on the seat in the raised, working position, rotated facing the rear of the stand.

Figure 3B:
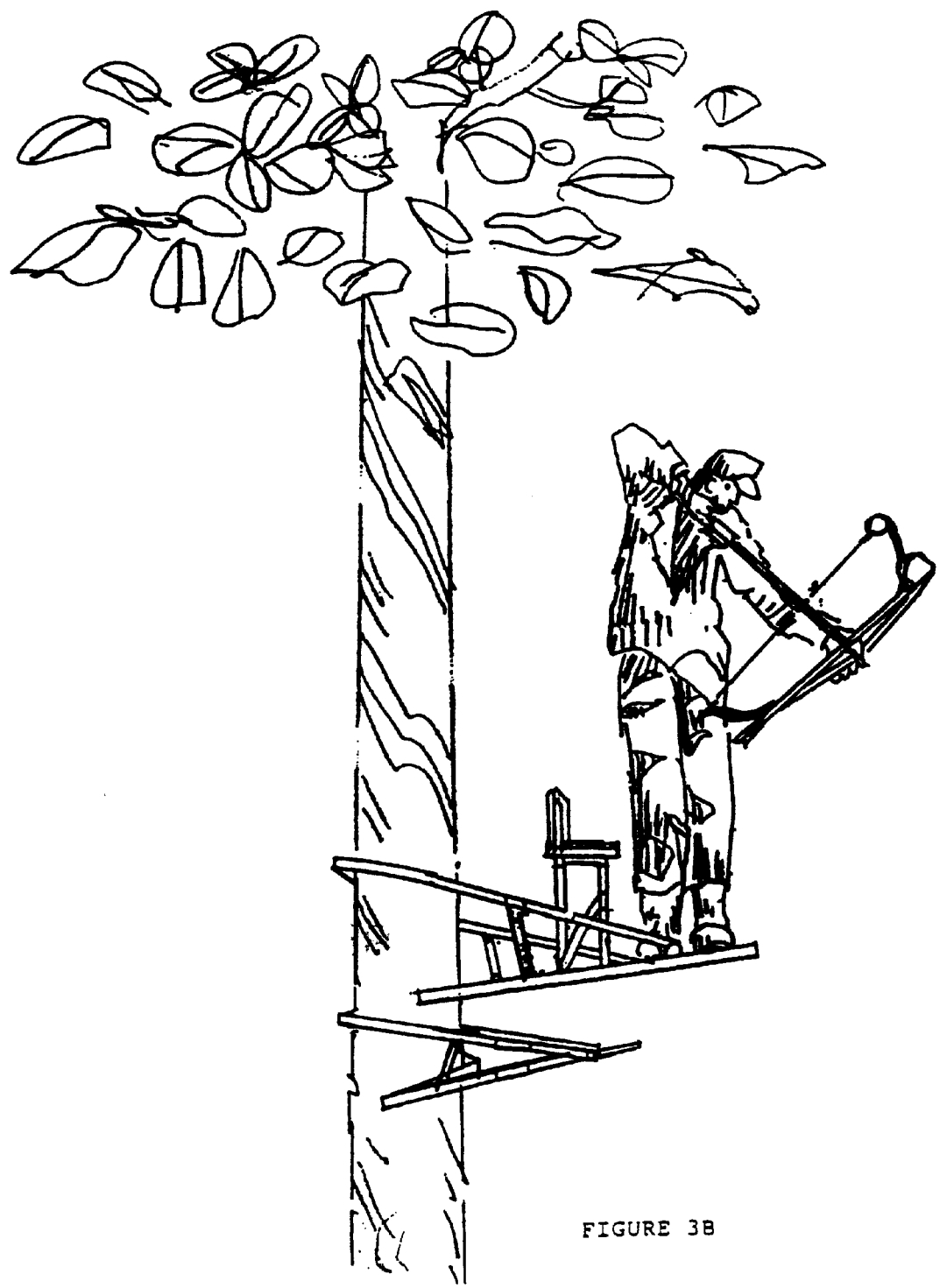

FIG. 3B shows the hunter shooting a bow & arrow while standing on the abrupted standing platform.

Figure 4A:
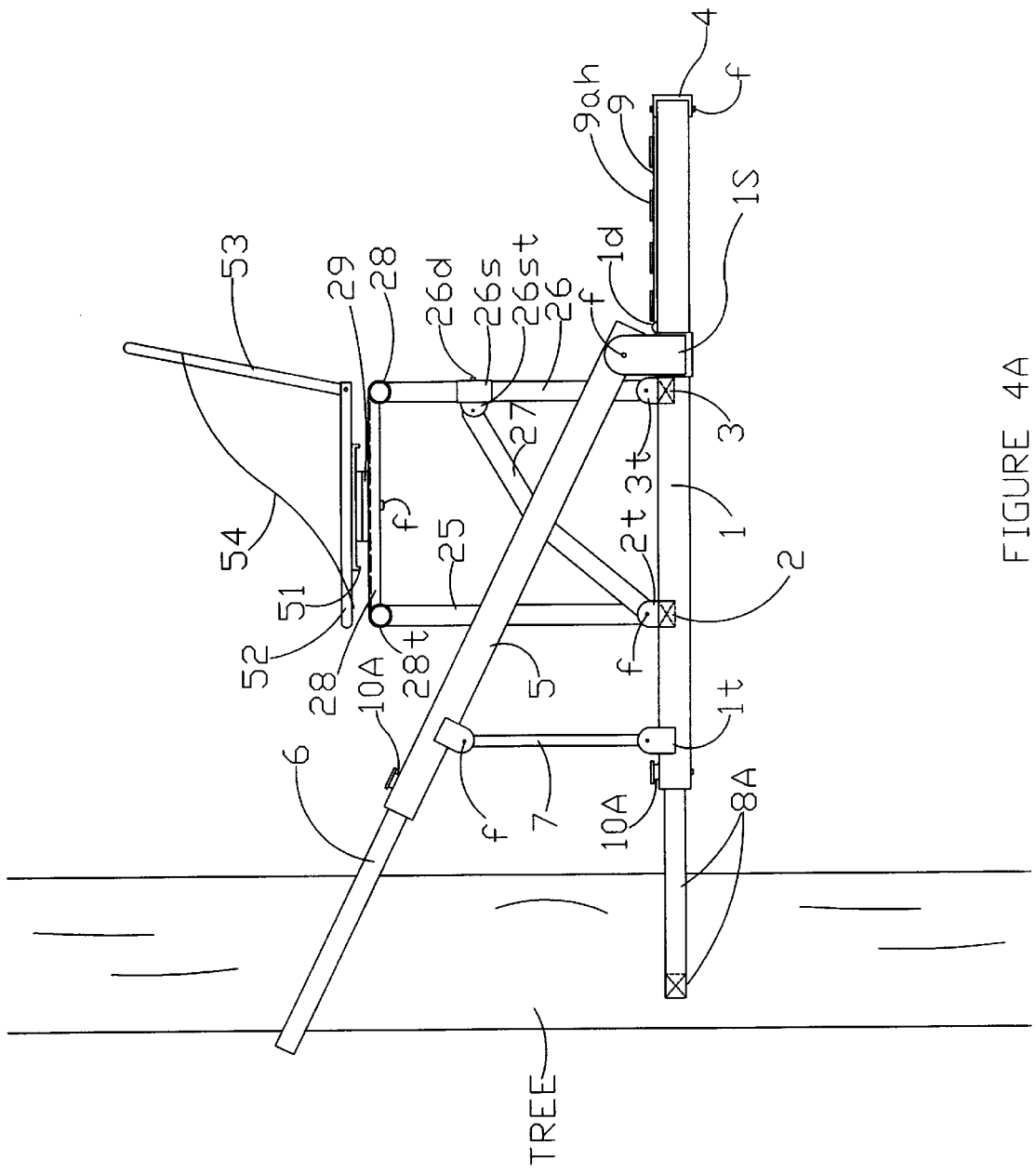

FIG. 4A is a side elevational view of the tree stand in the raised working position.

Figure 4B:
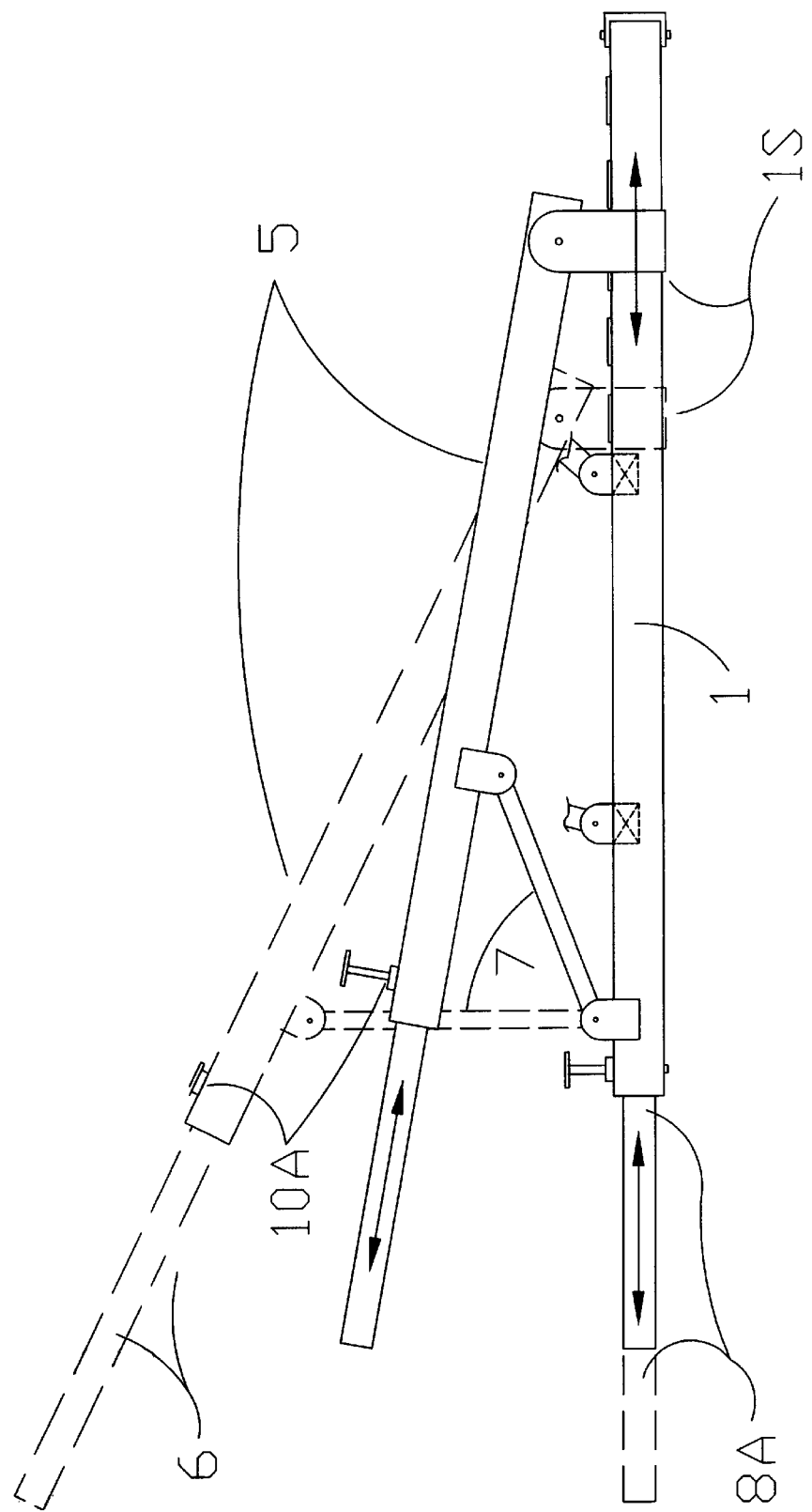
Figure 4C:
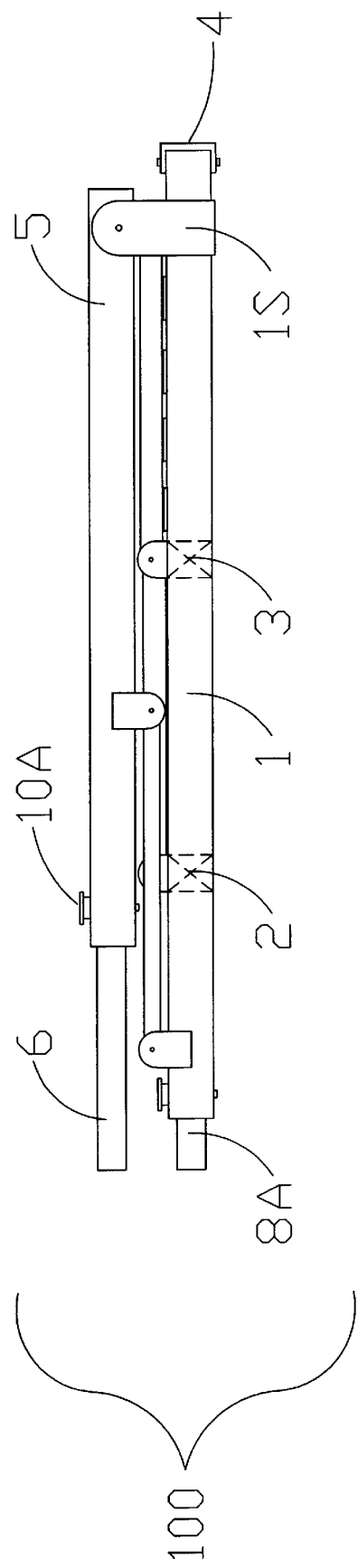

FIG. 4B is a side elevational view of the tree stand in a transitional position either collapsing from an initially raised position of FIG. 4A or raising to the upright, working position from an initially collapsed position of FIG. 4C.

FIG. 4C is a side elevational view of the tree stand in the collapsed, transporting position.

FIG. 5A is a side elevational view of the tree climbing aid in the raised, working position.

Figure 5B:
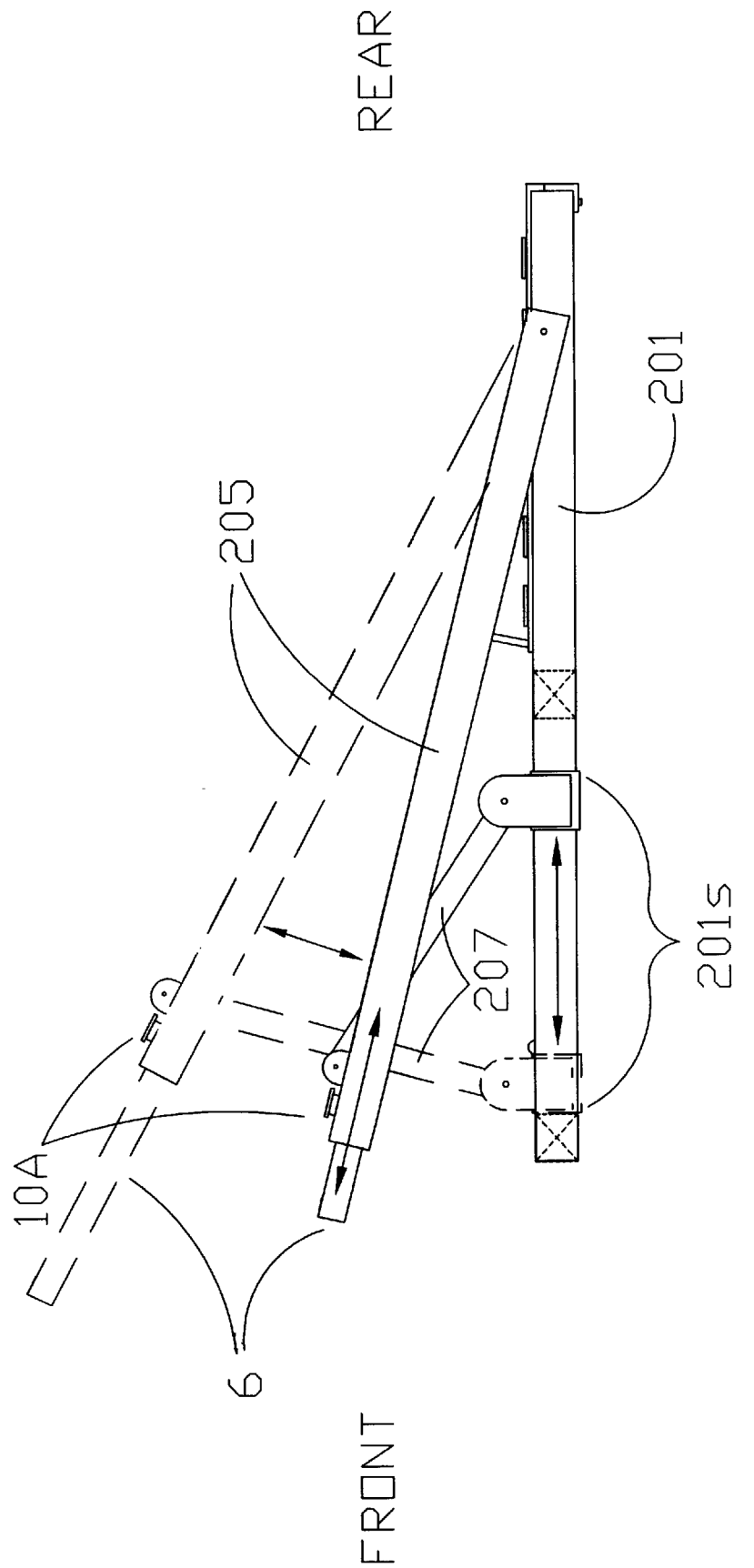
Figure 5C:
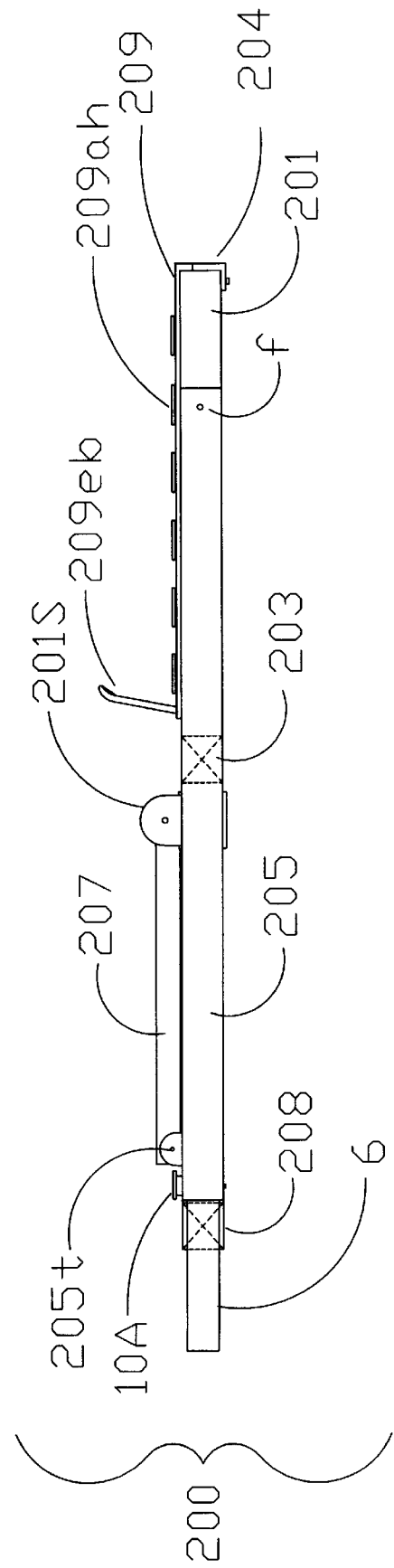

FIG. 5B is a side elevational view of the climbing aid in a transitional position either collapsing from an initially raised position of FIG. 5A or raising to the upright, working position from an initially collapsed position of FIG. 5C.

FIG. 5C is a side elevational view of the tree climbing aid in the collapsed, transporting position.

Figure 6A:
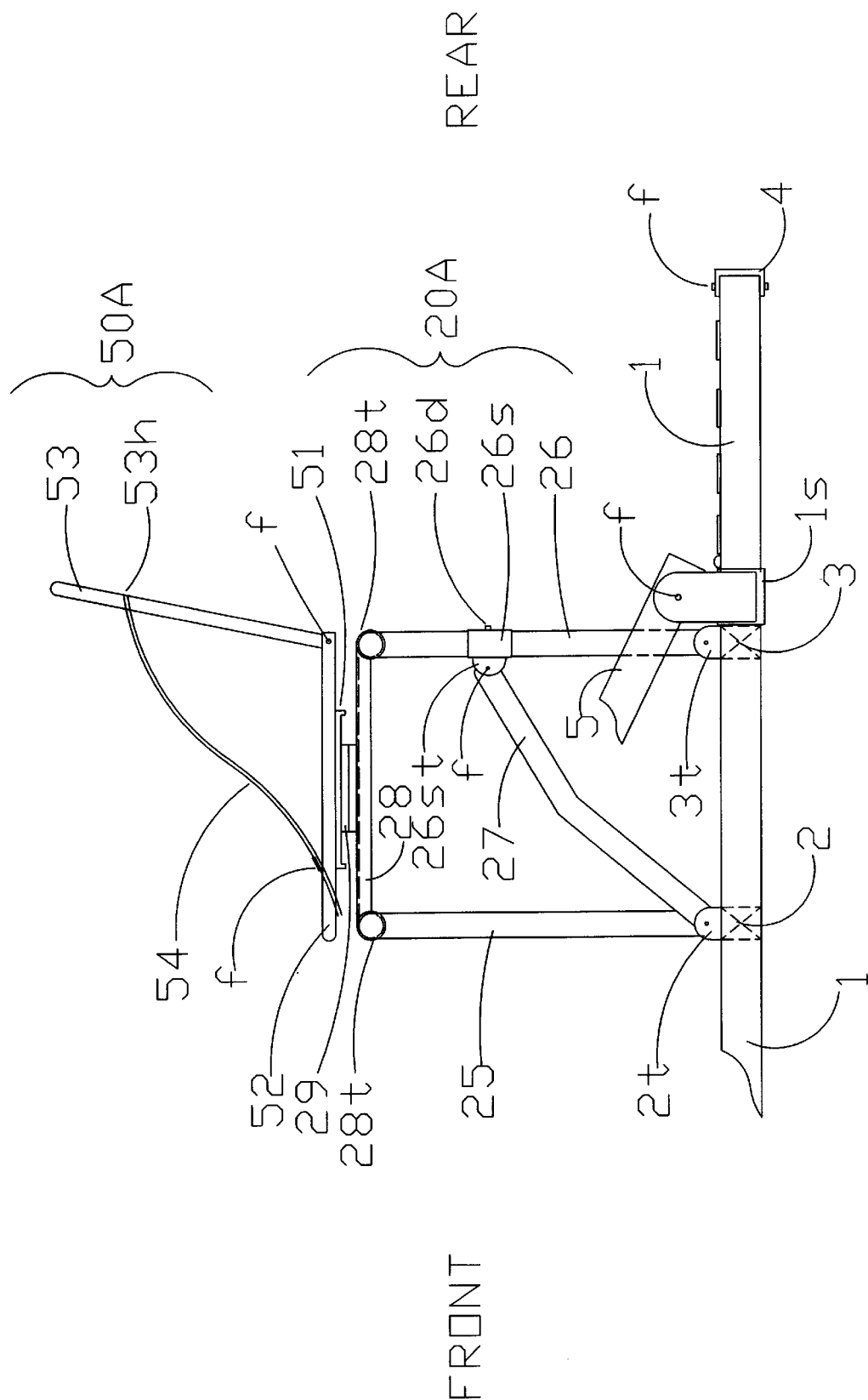

FIG. 6A is a side elevational detail view of the seat and seat frame assembly in the raised working position.

Figure 6B:
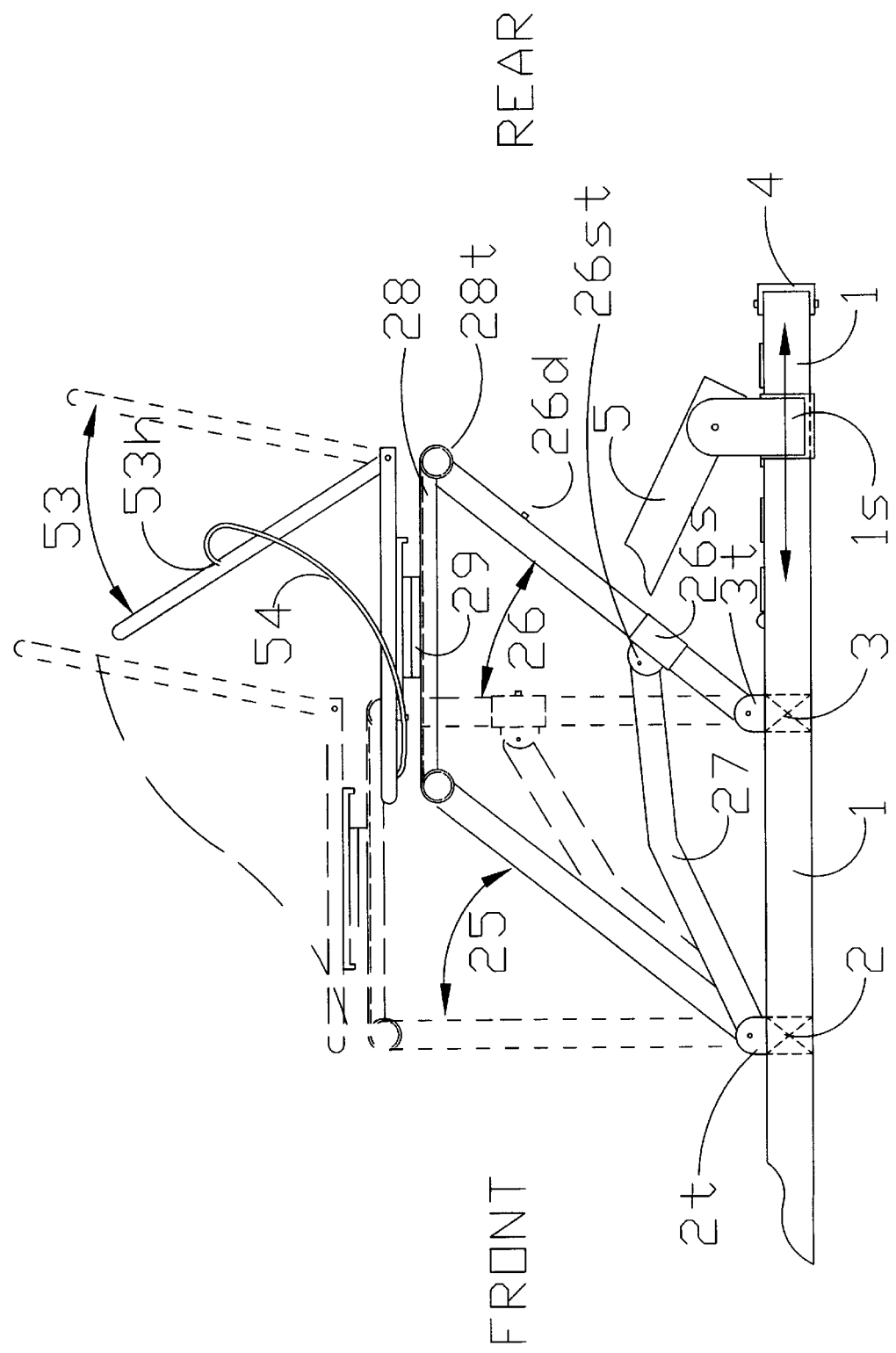
Figure 6C:
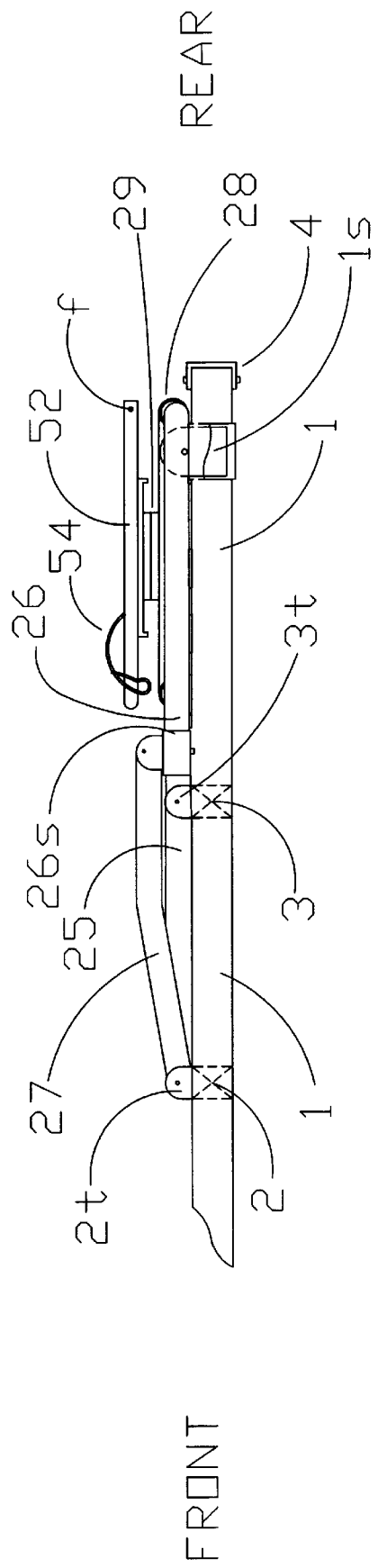

FIG. 6B is a side elevational detail view of the seat and seat frame assembly in a transitional position either collapsing from a initially raised working position of FIG. 6A or raising to the upright, working position from an initially collapsed position of FIG. 6C.

FIG. 6C is a side elevational detail view of the seat and seat frame assembly in the collapsed, transporting position.

Figure 7:
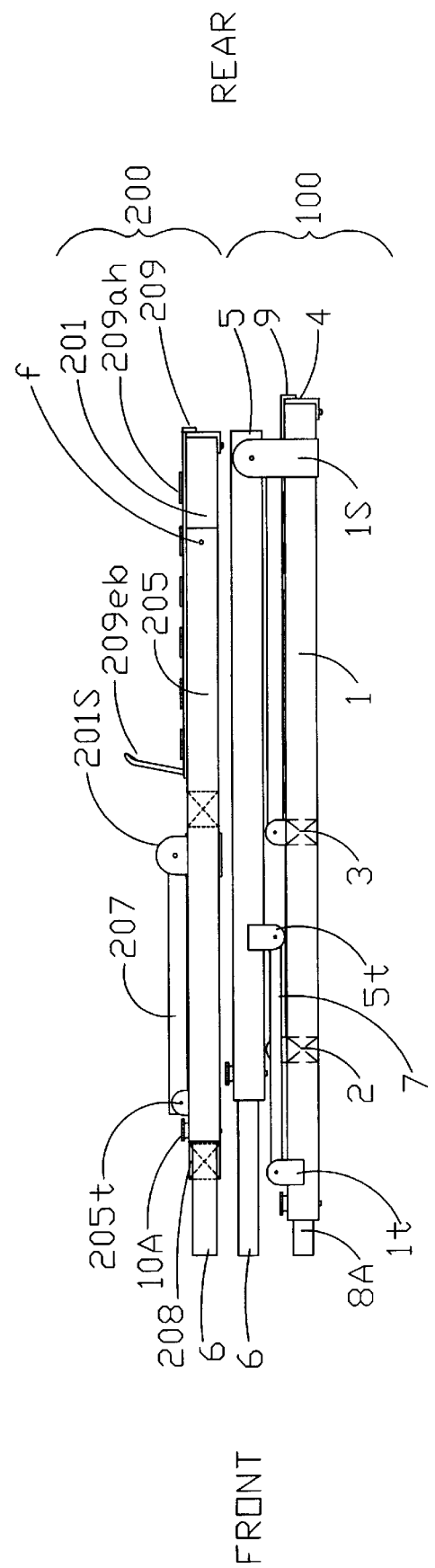

FIG. 7 is a side elevational view of the tree stand and tree climbing aid, together in the collapsed, transporting position.

Figure 8A:
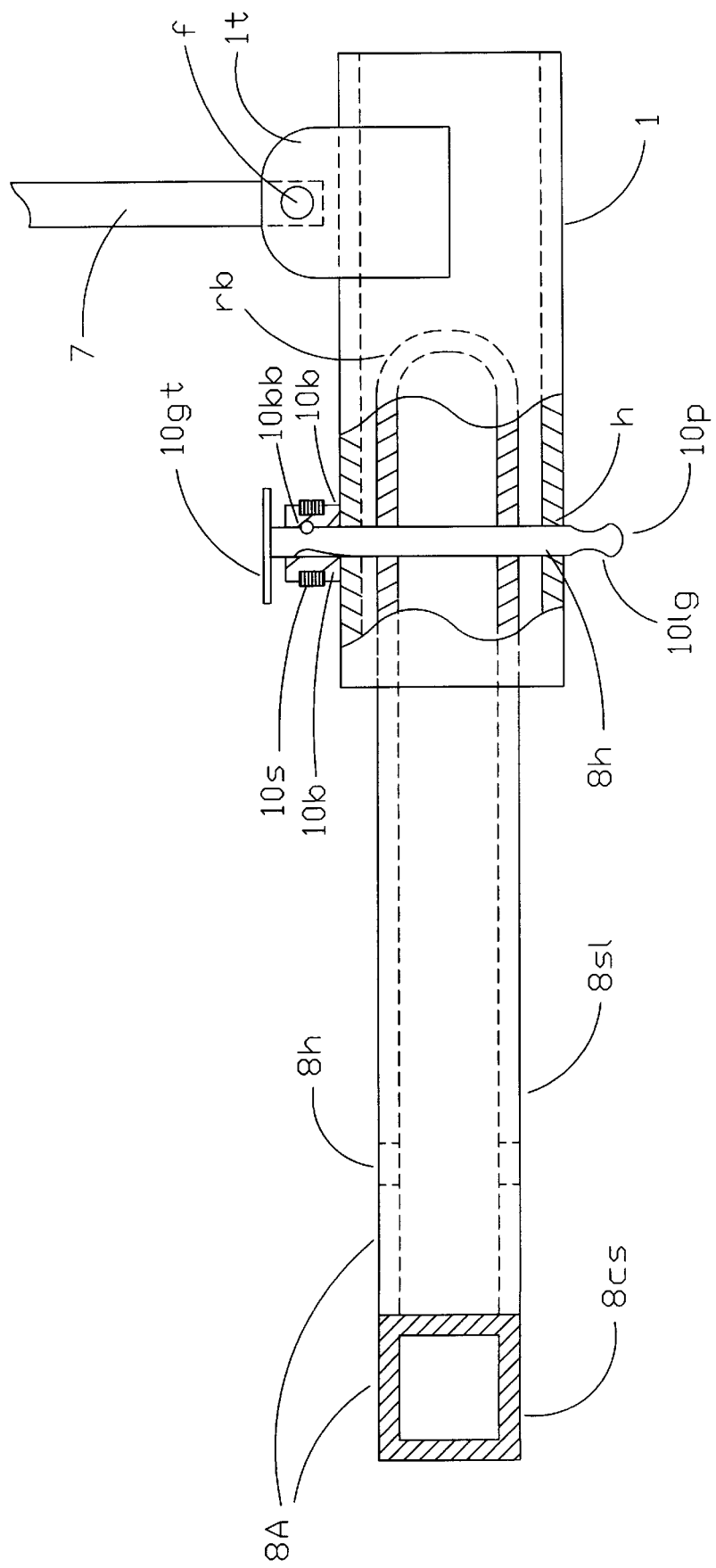

FIG. 8A is a side elevational detail fragmentary view of the locking pin assembly in the engaged position, securing the tree compressive assembly in the extended, working position; main angle strut is also shown in the raised working position.

Figure 8B:
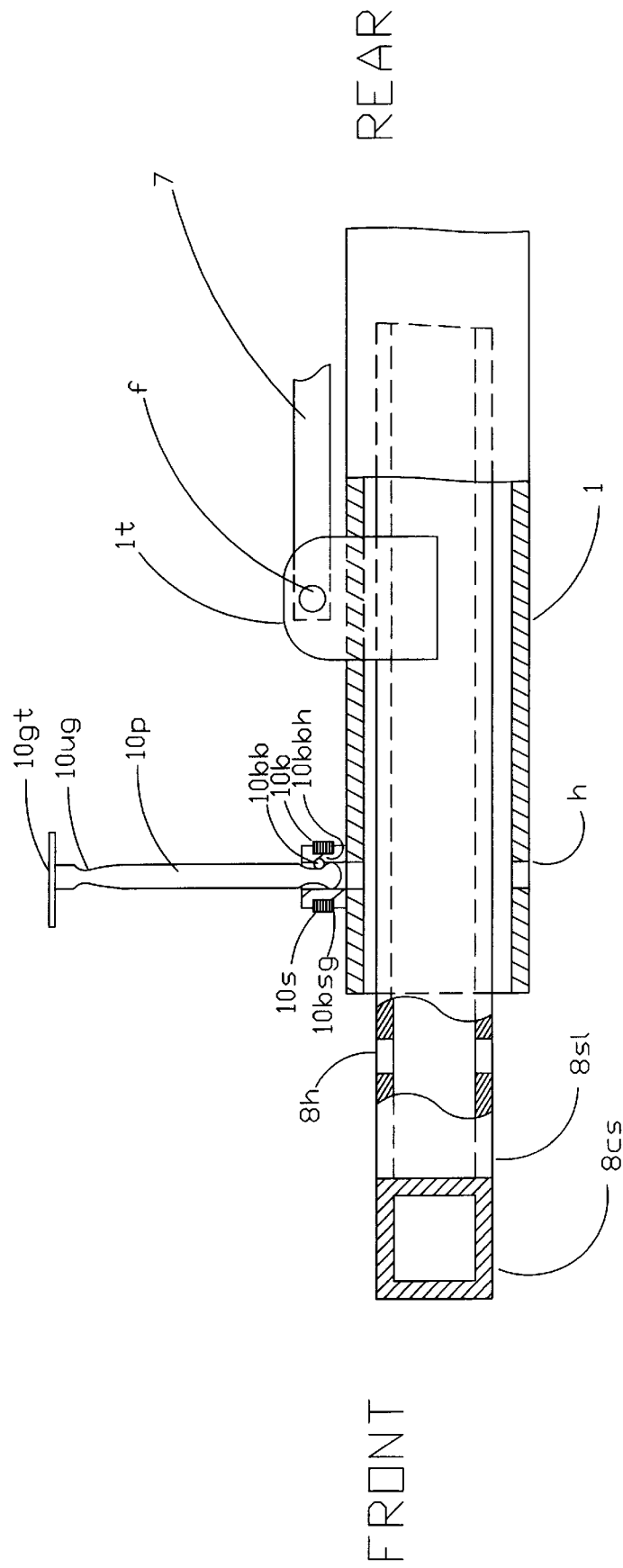

FIG. 8B is a side elevational detail fragmentary view of the locking pin assembly in the disengaged position, allowing the tree compressive assembly to collapse; main angle strut is shown collapsed.

Figure 9A:
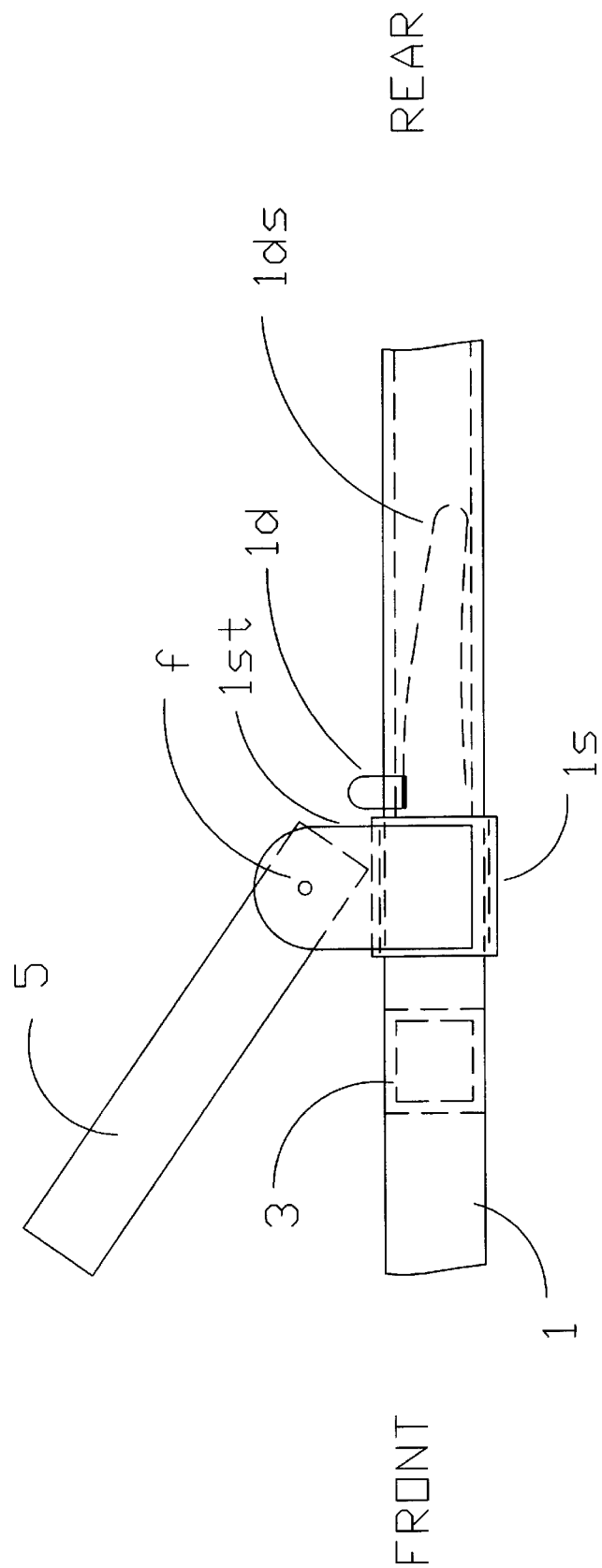

FIG. 9A is a side elevational detail view of the main frame slide and angle frame secured in the upright, working position.

Figure 9B:
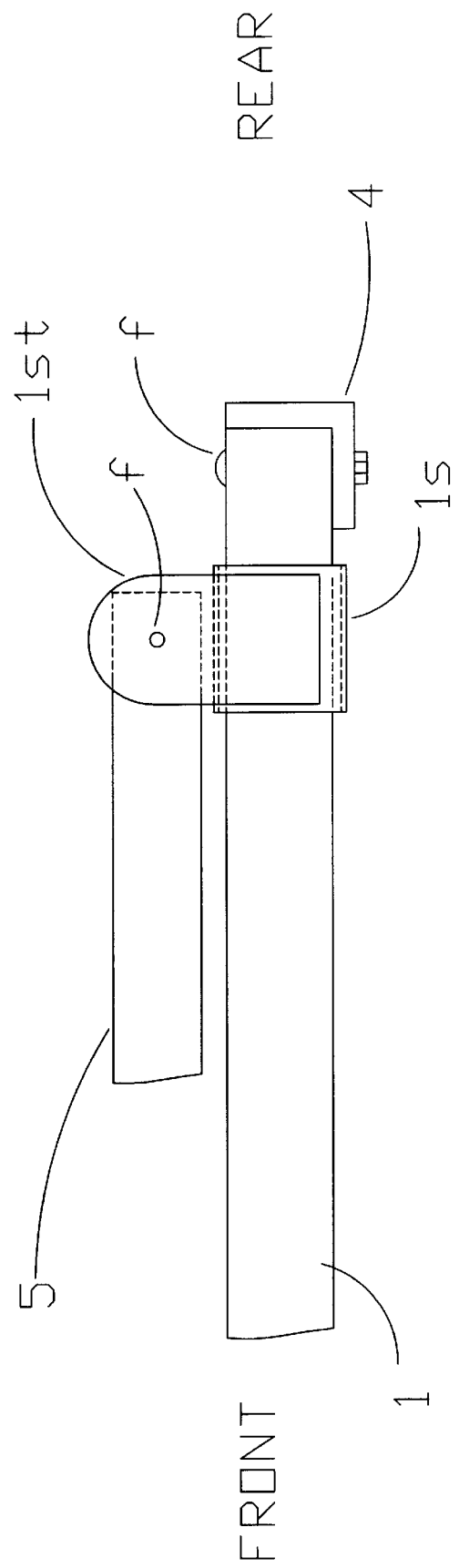

FIG. 9B is a side elevational detail view of the main frame slide released and allowing the main angle frame to collapse both flat and in length towards the rear of the stand.

Figure 10A:
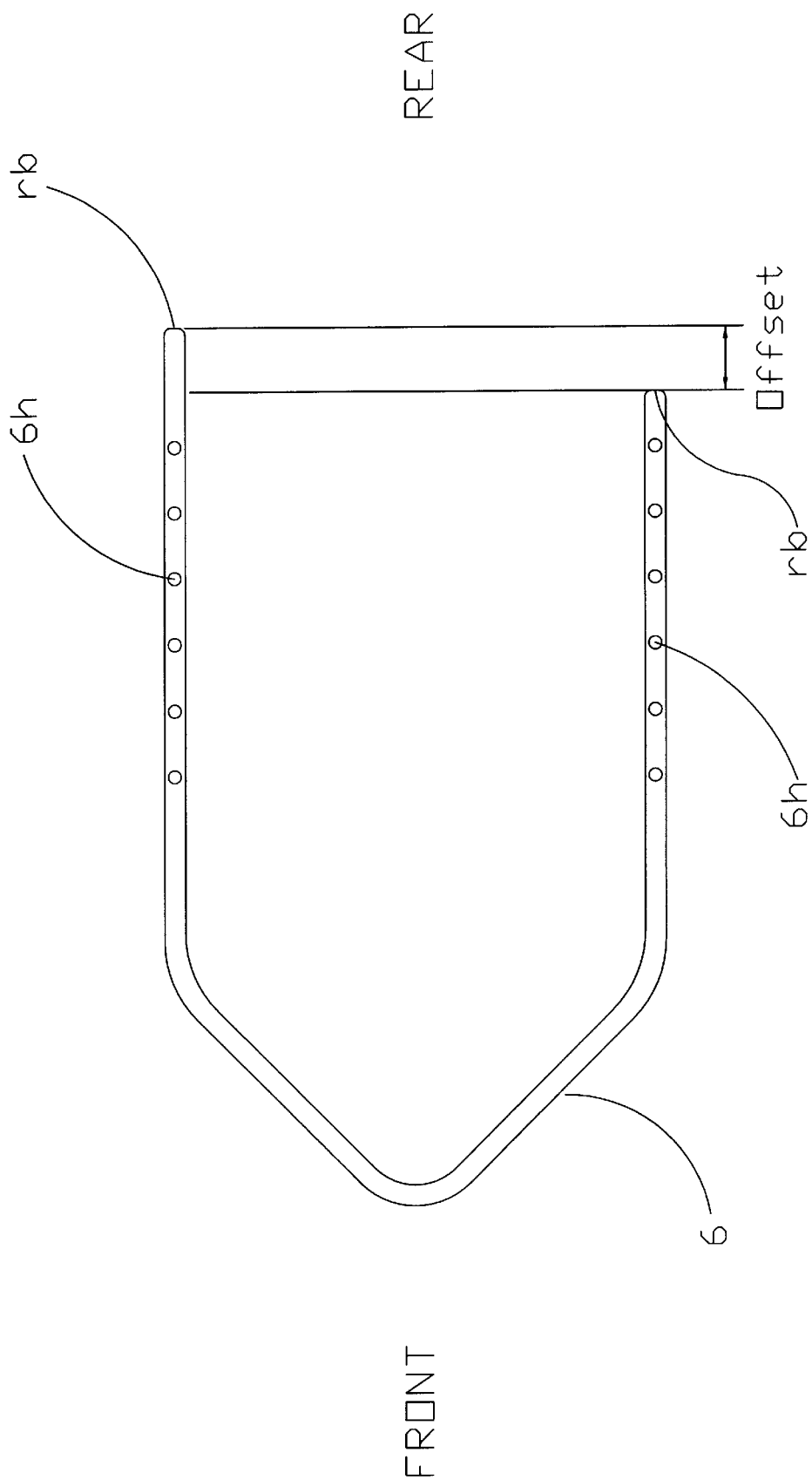

FIG. 10A is a top elevation detail view of the tree encircling member and "offset".

Figure 10B:
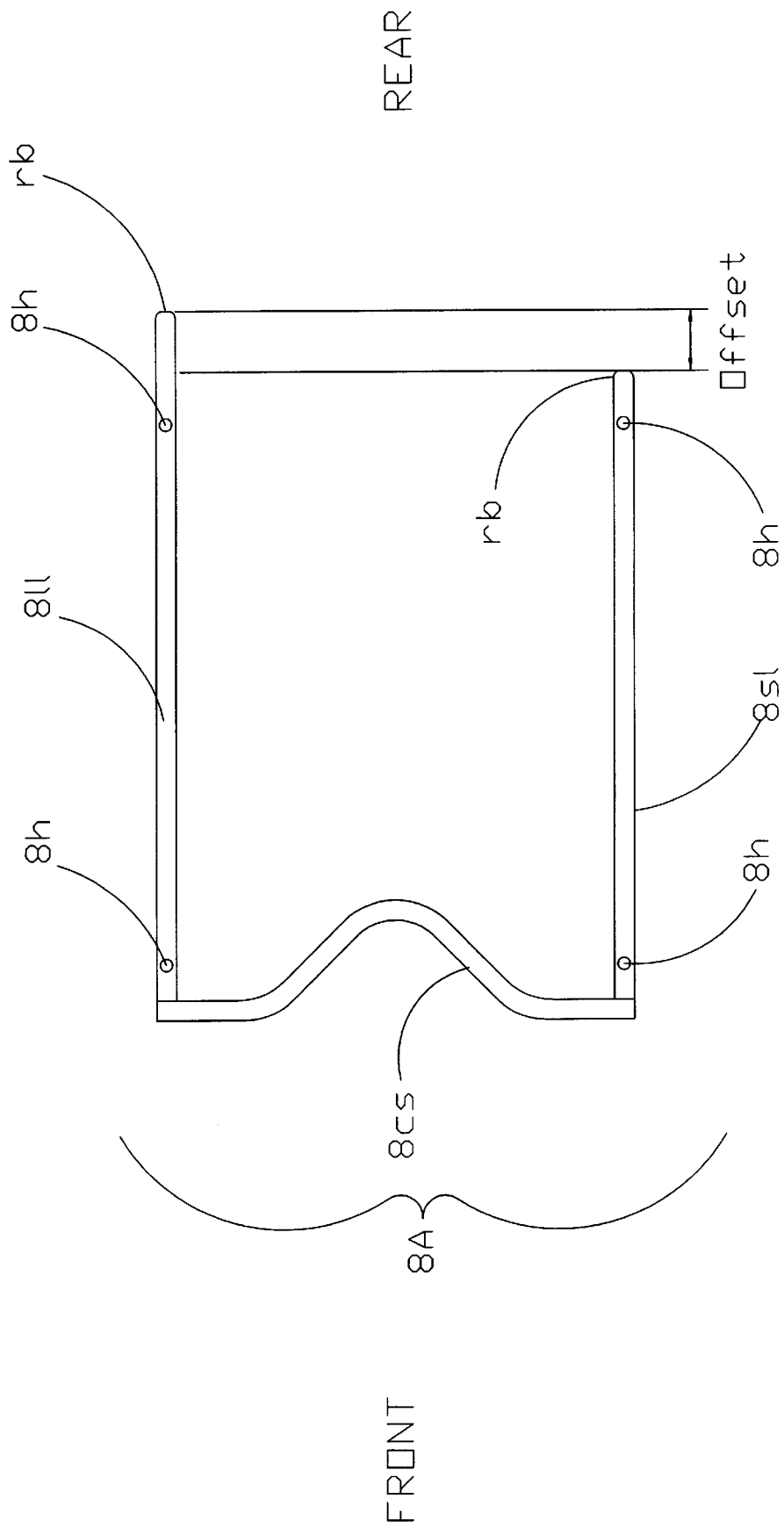

FIG. 10B is a top elevation detail view of the tree compressive assembly and "offset".

Figure 11A:
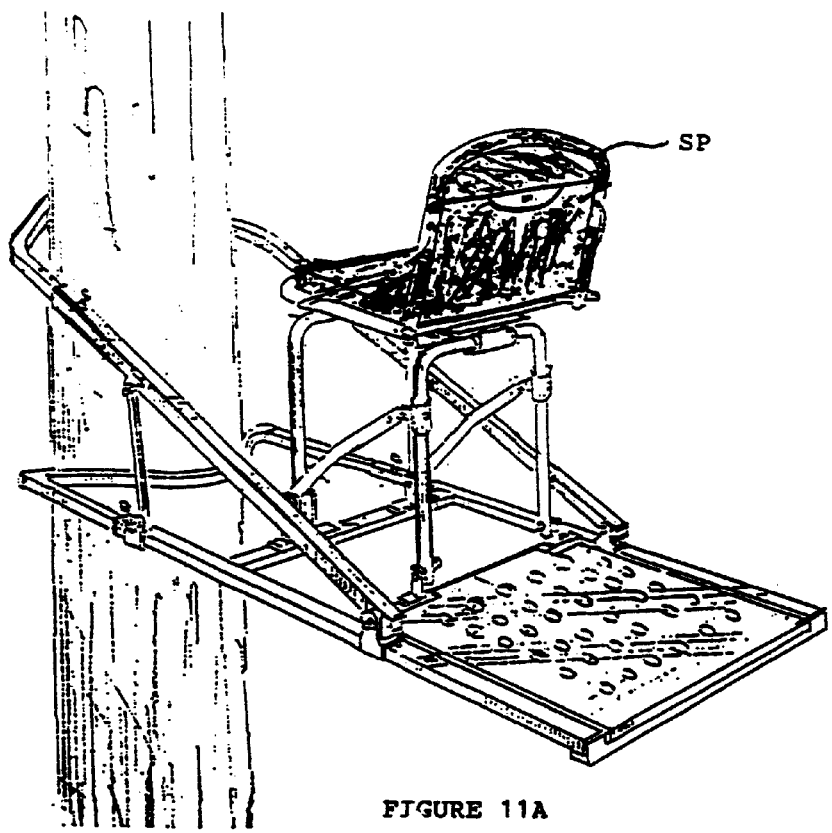
Figure 11B:
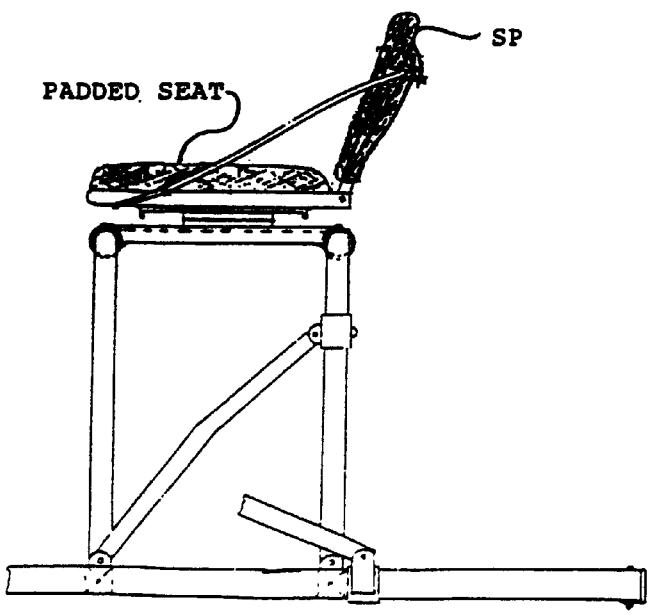

FIG. 11 is a perspective detail view of the seat backrest with fabric "pocket" attached and padded seat cushion.

DETAILED DESCRIPTION OF THE PREFERRED EMBODIMENT

Figure 1:
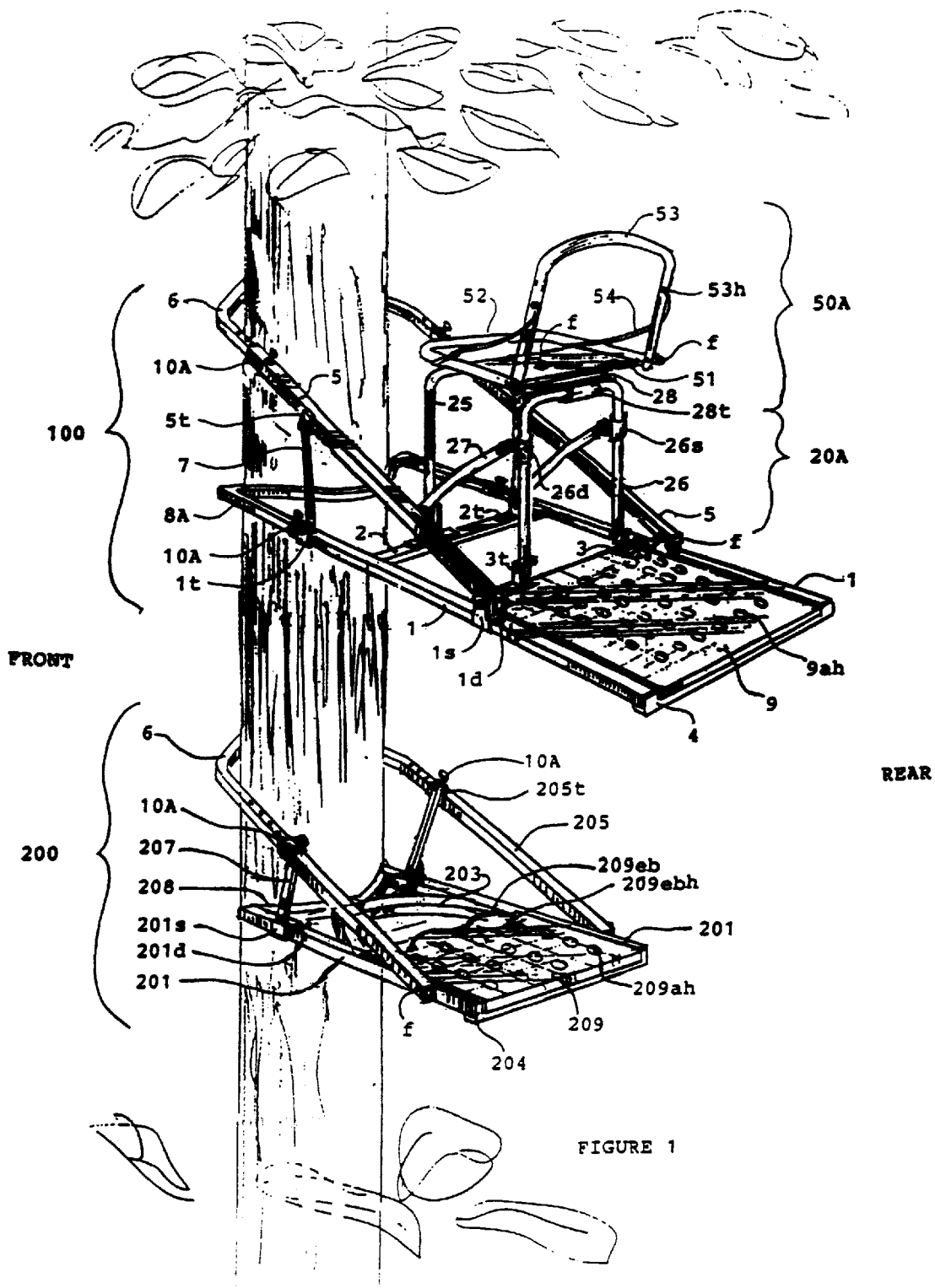
FIG. 1 is a perspective illustration of the tree stand and climbing aid constructed in accordance with the present invention.

Referring to FIG. 1, the climbing tree stand unit comprises two major units, the upper main climbing platform 100 and the lower foot climbing platform 200. The upper main climbing tree stand 100 is generally a rectangular shaped platform, generally referred to as the platform body, comprised of two parallel main members 1 which are connected generally perpendicularly to a front 2, center 3, and a rear crossmember 4. An abrupted standing platform 9 is connected to the center cross member 3 and rear crossmember 4. The platform 9 is bent at two generally 90 degree angles to make two short legs to increase the strength and rigidity of said platform 9. Abrupted standing platform 9 incorporates a plurality of raised or abrupted threw holes 9ah to increase traction between the users feet and the aforementioned standing platform 9 said connections of members 1 to said crossmembers are generally by welded connections or any other appropriate means.

A telescoping tree support assembly 8A can be either telescoped flush into receiving ends of main frame rails 1 to decrease overall stand length for increased compactability or extended into actual working position (See FIGS. 8A & 8B). Compressive support assembly 8A is comprised of two parallel legs 8ll and 8sl generally welded to secure to generally "-ᴠ-" shaped compressive tree support 8cs. Telescoping compressive assembly 8A is locked into either collapsed or extended working positions by two locking pin assemblies 10A secured to receiving ends of main frame rails 1. Telescoping tree support assembly 8A is provided with four threw holes 8h in offset legs 8ll and 8sl for locking pins 10p to extend threw to secure telescoping tree support member 8A in either collapsed or extended working position. Telescoping compressive assembly 8A is also offset in overall length FIG. 10B to allow operator to first insert longer leg 8ll and finally shorter leg 8sl into corresponding main frame rails 1 to ease assembly should telescoping tree support assembly 8A need to be unattached from main frame rails 1 by operator for any reason. In addition to "offset" leg lengths of both the tree encircling member 6 and the compressive member 8A, the free ends of said members are also crimped to a generally rounded point rb to further ease telescoping installation FIGS. 10A & 10B.

Two main angle frame rails 5 are attached to main frame rails 1 by angle struts 7 and angle frame slides 1s. The main angle frame rail 5 and main frame rail 1 are pivotally attached near front of said members via secured strut tabs 1t & 5t which are attached to angle strut 7 with bolt and nut fasteners f. At rear of stand 100, main angle frame rail 5 and main frame rail 1 are attached by a slidable main frame slide 1s. In the working position, the angle frame rail 5 is locked in the upright position by sliding the angle frame slides 1s from the rear of stand (collapsed position) to the center frame crossmember 3 (upright position) FIGS. 9A & 9B. In the upright working position, the frame slide 1s is secured between center frame crossmember 3 and locking detent pin 1d. Slide 1s is comprised of a short length of square tubing slightly larger than the main member 1. Slide 1s larger square tubing size allows slide 1s to "enclose" around and freely slide along length of main member 1s between and not past crossmembers 3 & 4. Slide 1s is further comprised with two secured tabs 1st generally attached by a welded connection. Secured tabs 1st are equipped with threw holes to allow angle members 5 to pivotally attach at members 5 rear free ends via fasteners f. Slide 201s is constructed with attached tabs 201st similarly to slide 1s. Slides 201s also allows for slides 201s to travel along length of member 201 between and not past members 208 & 203. Attached tabs 201st allow for a pivotal connection with strut 207 via fastener f. Detents 1d, 201d & 26d are secured to a compressed generally "U" shaped length of spring steel 1ds FIG. 9A. Bolt and nut fasteners f pivotally attach struts 7 to angle frame rail 5 and mainframe rail 1 via strut tabs 1t & 5t and allow said strut 7 and attached angle frame 5 to move upright and forward in the working position or generally flat and towards the rear of stand 100 in collapsed position when frame slide 1s is slide forward or back respectfully FIGS. 4A, 4B & 4C. Member 5 is free to move to a collapsed position when slide 1s is released from a secured position by depressing detent 1d however member 5 remains undetachable at either of said members 5 ends to main platform in either the upright working or collapsed position FIGS. 4A, 4B & 4C.

Main angle frame rail 5 has locking pin assembly 10A attached to secure telescoping tree encircling member 6 at receiving ends of rigid members 5. Telescoping tree encircling member 6 is a single square tube member comprising a generally angular configuration with parallel legs FIG. 10A. The rigid characteristics of the encircling element 6 in addition to the telescopic mating of member 6 into receiving ends of members 5 helps to ensure that encircling member 6 will remain in the working position around the tree if either of the locking pins 10p should inadvertently become disengaged or fail for any reason. Tree support member 8A is also constructed of rigid square tubing and is telescopically connected to members 1 to also ensure that member 8A remains in the working position if either of the locking pins 10p should fail. The rigid characteristics of members 6 & 8A in addition to the telescopic connection of said members into members 5, 205 & 1 acts as additional safety backup features to help ensure that said members 6 & 8A will maintain there respective working positions in the unlikely case a locking pin 10p should fail or become disengaged for any reason. Parallel legs of said encircling member 6 are offset in length so that the operator can insert each leg independently and separately into receiving ends of main angle frame rails 5 which is easier than having to insert both legs simultaneously if said leg lengths where not offset in length. Said encircling member 6 is also equipped with a plurality of threw holes 6h on each parallel leg so that said member can be easily secured in multiple settings with locking pin assembly 10A depending on the girth of the tree to be climbed.

Seat frame assembly 20A consists of front 25 and rear 26 generally inverted "U" shaped seat frames and two generally "⌒" shaped struts 27 and two tubular slides 26s. Frontal 25 and rear 26 tubular seat frames are pivotally attached at their ends to the front 2 and center crossmembers 3 respectfully via tabs 2t & 3t via bolt and nut fasteners f. The generally central location of seat 50A and seat frame assembly 20A relative the platform body places the operator's center of gravity sufficiently away from the tree to ensure a greater resulting "binding torque" relative the tree to increase stands 100 stability. Said increased binding torque of stand 100 also allows for tree encircling and compressive members 6 & 8A to positively grip the trees surface without the need of attached spikes or sharp blades common to most tree stands tree engaging members. The tree climbing aids 200 tree engaging members 6 & 208 also do not require additional tree gripping devices which can unduly damage the trees protective surface. The ability of tree stand 100 and climbing aid 200 to climb a tree without the need of damaging tree gripping blades or spikes allows the operator to successfully climb a tree without damaging the trees protective bark surface. The seat and seat frame assembly 50A & 20A are engaged in the working position without regard to the position of the tree and does not require the tree itself to be utilized as a seat backrest or part of the seat frame supporting structure. Said front seat frame 25 is sufficiently smaller in width than said rear seat frame 26 to allow frontal seat frame 25 to collapse into and within rear seat frame 26 when seat frame assembly is in the collapsed, transporting position FIG. 6C. Frontal and rear seat frames 25 & 26 are rotatably connected to lower seat platform 28 via two tubular elements 28t Tubular elements 28t have sufficient diameter clearance to rotate freely about center length of seat frames 25 & 26. A means of securing said tubular elements 28t to lower seat platform 28 at platforms generally frontal and rear edges wherein said means of securing elements 28t to edges of platform 28 is generally achieved by welded connections. Seat support frames 25 & 26 secure a generally upright perpendicular position relative to platform body via two seat frame struts 27. Seat frame struts 27 are pivotally connected to frontal crossmember 2 at struts generally frontal free ends via secured tabs 2t. Said struts 27 are generally adjacent to front seat frame 25 and in-line with rear seat frames 26 parallel free ended legs. Struts 27 are pivotally connected to tubular slides 26s at struts generally rear distal ends. Tubular slides 26s are equipped with welded secured tabs 26st to allow for a pivotal connection with rear free ends of strut 27. Tubular slides 26s have sufficient inside diameter to allow slides 26s to move freely along lengths of rear seat frames 26 generally parallel leg lengths FIG. 6B. Tubular slides 26s lock seat frames and struts 27 into said upright perpendicular position when apertures in slides 26s are biased with two spring loaded detents 26d. Seat 50A and seat frame assembly 20A can obtain either an upright elevated secured working position FIG. 6A when strut slides 26s are locked via said detents 26d or obtain a generally flat rearwardly collapsed position FIGS. 6B & 6C when said detents 26d are released for ease of transport by the operator.

Upper rotating seat platform 51 is pivotally secured to lower seat platform 28 via bolt and nut fastener f. Platforms 51 & 28 are constructed with two short 90 degree bends at unsecured edges of said platforms to increase said platforms strength and rigidity, similarly to platforms 9 & 209. Sandwiched between aforementioned platforms 51 & 28 are swivel seat bushings 29 which have threw holes centrally located which act like large washers between said platforms. Said bushings 29 are made from a plastic or plastic type material to reduce the noise between platforms 51 & 28 when said platforms are rotating relative each other.

Upper swivel seat frame 52 and backrest 53 are generally "U" shaped. Backrest 53 is smaller in width to allow backrest 53 to collapse within seat frame 52 when the seat is in the collapsed transporting position. Seat frame 52 is pivotally secured to folding backrest 53 at said members free ends via bolts and nut fasteners f FIGS. 6A, 6B & 6C. Seat frame 52 is welded securely to upper seat platform 51. Backrest 53 is locked in generally upright position via singularly secured wire 54 which runs into threw holes 53h and hollow length between said threw holes 53h. Free ends of wire 54 are wrapped and secured around seat frame 52 via fastener f as shown in FIG. 1 & 6A.

The lower foot climbing unit 200 is comprised of a generally rectangular shaped climbing platform (platform body) with a undetachable, collapsible angular members 205. Two main frame members 201 are secured to frontal compressive tree angle 208 and rear support crossmember 204. Members 208 & 203 are generally "∨" shaped. Secured to both main frames 201 at opposite ends and generally at the center of curve of frontal compressive tree member 208 is the angular support member 203. Said securing means is generally achieved by welded connections. The platform base plate 209 is bent at generally 90 degree angles with two short legs to increase platforms 209 strength. Platform 209 is equipped with a plurality of abrupted or raised holes 209ah to facilitate greater traction between said platform and the users feet. At generally the front of aforementioned platform 209 are three threw holes 209ebh, two at exterior edges and one centrally. An elastic band 209eb is threaded threw said holes to form an stretchable foot securing latch. Platform 209 is secured by welding or other appropriate means to members 201, 203, and 204.

Main angle member 205 is pivotally attached at rear to main frame member 201 by a threw bolt fastener f. At frontal end, main angle member 205 is pivotally attached to main frame member 201 via strut 207. Strut 207 is pivotally attached to main angle member 205 by secured strut tabs 205t via fasteners f. Strut 207 is pivotally attached to main frame 201 via secured tabs 201st of slide 201s. Main angle frame 205 can be either extended upright in working position by sliding locking slide 201s toward and against compressive tree frame 208 as shown in FIGS. 5A, 5B and 5C. Slide 201s is locked into an upright position by being nested between tree compressive member 208 and springloaded detent 201d. Main angle frame 205 collapses flat with platform base by releasing detent 201d and sliding slide 201s back toward rear of climbing aid 200 generally adjacent to member 203. Main angle frame 205 has locking pin assembly 10A secured at front receiving end of said member 205. Tree encircling member 6 is telescoped into main angle frames 205 to achieve tree girth adjustment. Tree encircling member 6 is equipped with a plurality of threw holes 6h on both legs to secure said member to main angle members 205 via locking pin assemblys 10A. Tree encircling member 6 has legs of unequal length. The aforementioned leg length offset allows operator to concentrate on inserting one leg at a time and not both legs simultaneously which often is very difficult. In addition, the offset legs of tree encircling member 6 are crimped in FIG. 10A to a generally rounded point rb to aid the user when initially inserting said legs into main angle frame 205. The aforementioned rounded point rb is so shaped to enable user to insert legs easily but without posing a safety risk by unintentionally spearing the user.

The present invention is comprised of a easily portable tree climbing stand 100 and foot climbing aid 200. The tree climbing stand 100 in the working position has an overall length dimension of approximately 45 inches and a width and height of approximately 20 inches. In the collapsed transporting position the tree compressive assembly 8A telescopes into main frame 1 and assumes an overall length of approximately 32 inches and a overall height of approximately 3 inches. The tree climbing aid 200 collapses substantially to an approximate length of 30 inches, an approximate height of 1 inch, and a constant approximate width of 20 inches in the transporting position. The aforementioned working and transporting dimensions are general approximations, said dimensions have been established to give the tree stand 100 and climbing aid 200 favorable overall functional characteristics, however can easily be changed or modified to satisfy specific application demands. In the collapsed transporting position the main angle frame rails 5 collapses compoundly to a generally overlying position and a position adjacent the rear of the platform body, where angle rail 5 collapsed length does not exceed length of main frame rail 1. Seat 50A and seat frame assembly 20A also collapses to an overlying and generally flat position relative the platform body. Ability of the stand to collapse in overall height and length allows operator to easily transport stand in woods or in the trunk of a small car FIG. 7.

The tree stand 100 in the portable collapsed position is readily achieved by simply releasing detents 1d and allowing angle frame rails 5 to follow pivotally attached slides 1s which slide along member 1 generally to a position adjacent to rear crossmember 4. Compressive member 8A and encircling member 6 are easily collapsed in overall length by disengaging locking pin assemblies 10A and fully telescoping said members into mainframe rails 1 & 5 respectfully FIGS. 4A, 4B & 4C. Seat 50A and seat frame assembly 20A assume an overlying position relative the platform body by simply releasing detents 26s and allowing said seat 50A and seat frame 20A to rotate down and back towards rear of platform body FIGS. 6A, 6B & 6C. Seat and seat frame assembly 50A & 20A easily assume an elevated, upright working position by simply pulling said seat assembly 50A up and towards front of stand 100 and allowing detents 26d to engage into apertures in tubular slides 26s. Climbing aid 200 also easily collapses flat by simply releasing detents 201d and allowing slide 201s to travel back along frame rails 201 towards center of platform. Climbing aid encircling member 6 is then fully telescoped into collapsed angle member 205 to reduce platforms overall length FIGS. 5A, 5B & 5C. Tree stand 100 and climbing aid 200 rigidity is increased due to the fully connected and undetachable angle struts 7 and 207 respectfully which secure load bearing angle frame rails 5 and 205 to a fixed upright position relative the respective platform bodys. In addition to platform crossmembers, single abrupted standing platforms 9 & 209 aid in increasing overall platform bodys 100 & 200 strength and rigidity.

Figure 2B:
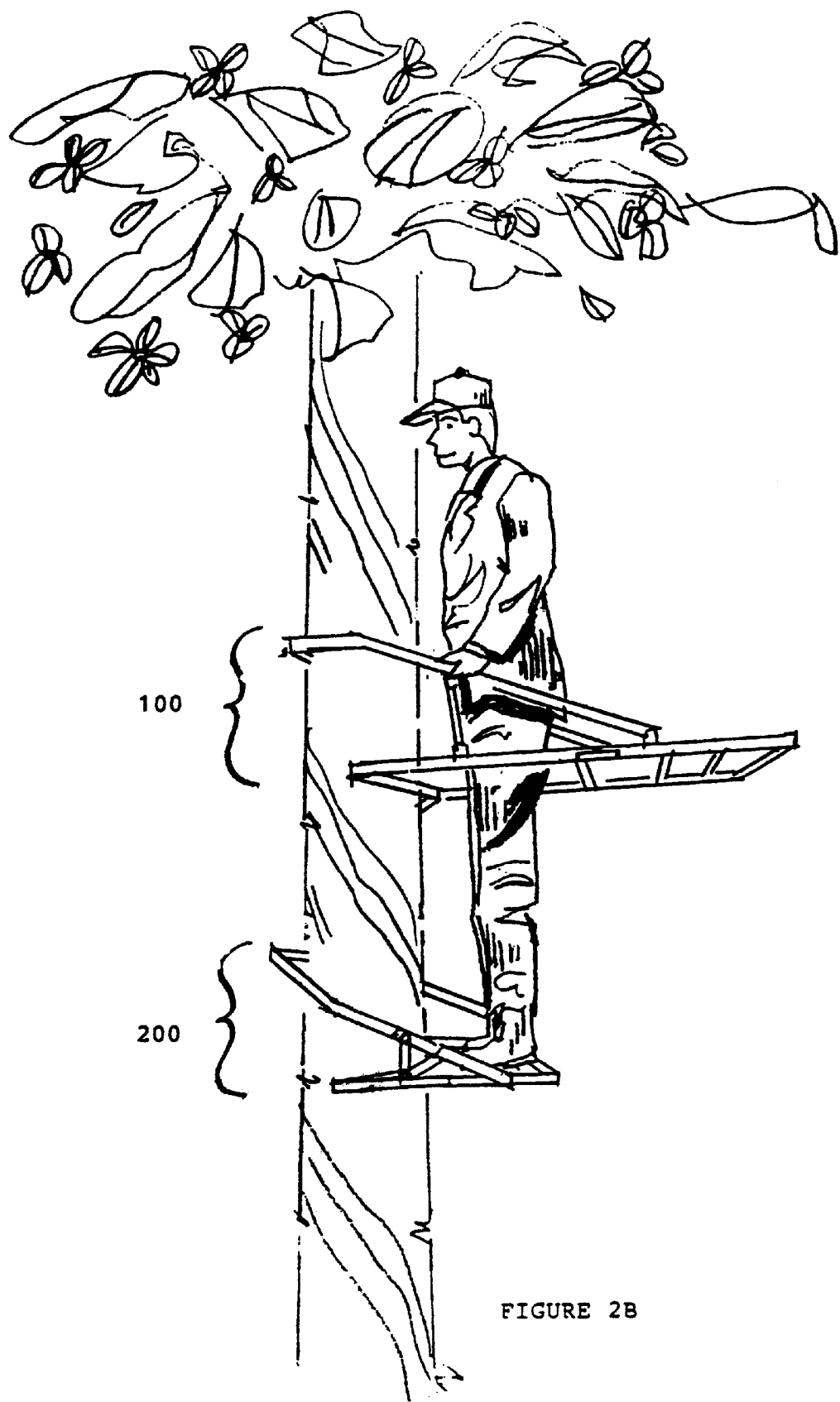

Climbing a tree is accomplished by using the safer and less physically demanding sit and stand method where the operator comfortably ascends or descends the tree by simply repeating an alternating sit and stand posture FIGS. 2A & 2B. Tree stand unit (stand and climbing aid) is lightweight, made of lightweight aluminum alloys except for the pins and bolts which are made of high strength steel. Tree stand 100 and climbing aid 200 stationary components are generally secured together where applicable by welding or any other appropriate means. Pivotal connections of said tree stand 100 and climbing aid 200 are secured by generally bolt and nut fasteners f or any other appropriate means. Where pivotal and stationary connections and are present in said tree stand 100 and climbing aid 200 and secured with fasteners, said fasteners are spaced with generally plastic type washers or spacers to reduce noise between moving and stationary parts. Secured tabs 1t, 2t, 3t, 5t, 1st, 26st, 201st & 205t are equipped with threw holes or apertures to secure said pivotally connected fasteners f to respective members. Said pivotally connected struts and members are also supplied with threw holes or apertures to secure said pivotally connected fasteners where said pivotal connections have been referred to. Stand 100 is approximately 15–18 lbs and climbing aid 200 is approximately 5–7 lbs depending on the weight carrying model provided.

Seat 50A is capable of complete 360 degree rotation by connecting rotating seat platform 51 to lower platform 28 by a single bolt and nut fastener f. Seat is also supplied with a padded seat to allow user to sit comfortably for extended periods of time FIG. 11. Plastic type material is used as large washers 29 sandwiched between said seat platforms to allow platforms 28 & 51 to rotate smoothly and quietly about said fastener. Said seat 50A and seat frame 20A assembly secure a sufficiently raised upstanding position relative the platform body to ensure the user a comfortable seated position FIG. 3A. Said seat and seat frame assembly 50A & 20A is generally centrally located relative said platform body to ensure that the user can fully rotate in the seat without any obstructions from the tree. Unrestricted rotating ability further ensures that operator can easily rotate to realize any field of view relative the platform body and the tree. The generally central location of the seat and seat support assembly 50A & 20A places the users center of gravity substancially away from the tree, effectively increasing the stands 100 gripping torque relative the tree when the seat is used by the operator in the secured working position. The resulting increased gripping torque stand 100 and climbing aid 200 eliminates the need of damaging tree encircling and compressive members, in addition to tree stand securing ropes and attachments required for the safe use of many tree stands. Said location of the elevated seat and seat frame assembly 50A & 20A also eliminates the need to use utilize the tree itself as a backrest and or seat supporting member, common with many tree stands currently on the market. The seat backrest 53 is pivotally secured to the swivel seat frame 52 at their respective ends via fasteners f. Seat frame 52 and backrest 53 are generally "U" shaped where backrest 53 is sufficiently smaller in width to allow said backrest to "nest" within frame 53 when seat assembly 50A is in the collapsed position or when the operator elects to sit without the use of the backrest 53. Said backrest 53 is secured in the upright working position via a single plastic coated wire 54 which is treaded threw holes 53$h$ in backrest 53 and secures a loop around seat frame 52 at both free ends of said wire FIGS. 1 & 6A. Said single wire 54 ensures that load is evenly distributed and that slack in wire is eliminated when backrest 53 is under load. Backrest 53 is also equipped with a fabric seat "pocket" sp to allow user to secure certain articles when climbing or transporting the tree stand FIG. 11. Stand 100 and climbing aids 200 abrupted standing platforms 9 and 209 respectfully are generous in size to ensure that the operator can comfortably stand on either platform FIGS. 2B & 3B. Said abrupted platforms raised holes (abrupted) configuration 9$ah$ & 209$ah$ also facilitates increased traction between the users feet when said platforms become wet.

Locking pins assemblies 10A of stand 100 and climbing aid 200 secure an engaged or disengaged position by a simple push/pull motion FIGS. 8A & 8B. Said locking pins 10$p$ are biased to retain said position by grooves 10$ug$ & 10$lg$ in said pin 10$p$ which spring loaded ball bearing 10$bb$ seats into. Said pin grooves 10$ug$ & 10$lg$ give the user a positive "feeling" locking action when the locking pin 10$p$ assumes an engaged or disengaged position. Locking pin bushings 10$b$ are secured to front free ends of angle members 5, 205 and main members 1 by a welded connection or any other appropriate means. Locking pin bushing 10$b$ is grooved 10$bsg$ to secure bushing spring 10$s$. Secured bushing spring 10$s$ retains ball bearing 10$bb$ in a threw hole 10$bbh$. Ball bearing 10$bb$ is restricted to travel only in threw hole 10$bbh$ inward not to exceed said pin grooves 10$ug$, 1$lg$ in said pins engaged or disengaged position, or along pins 10$p$ ungrooved surface when said locking pin 10$p$ is in transition from said positions. Where said locking pin bushings 10$b$ are secured, threw holes h are also present in line with bushings 10$b$ inside diameter to allow locking pin 10$p$ to travel clear threw said member 1, 5 & 205 to allow pin 10$p$ to realize engaged position FIG. 8A. Locking pin lop is also supplied with a washer type grip 10$gt$ on said pins upper free end. Said locking pin 10$p$ is also incapable of becoming free of locking pin assembly via contour groove 10$lg$ which said ball bearing 10$bb$ seats firmly into when said pin is in said disengaged position FIG. 8B. The inability of locking pin 10$p$ to become free of the locking pin assembly 10A ensures that the user will not have to contend with pins or bolt & nut securing fasteners becoming lost or working there way loose when transporting or actually using the tree stand and climbing aid 100 & 200. Tree encircling members 6, and compressive member 8A are slightly offset in leg length to allow operator to insert said members legs independently with respect to each leg to ease said members installation. Said installation is further eased by crimping said members leg ends generally to a rounded configuration rb. Said leg ends are crimped to a rounded configuration so that the operator does not unintentionally spear him or herself if said ends where crimped to a pointed form. The tree stand can also be used as a conventional "face the tree" tree stand if the operator desires to remain in the seated climbing position and elects not to raise the seat and seat frame assembly 50A & 20A FIG. 2A. The tree stand 100 and climbing aid 200 are comprised of integral elements which remain firmly attached to their respective platforms, eliminating the users need to worry about components which can work there way loose and easily become lost. The resulting tree stand 100 and climbing aid 200 offer the user a climbing tree stand which can be quickly and easily set up for actual field use or collapsed to a readily portable unit (See attached illustrations).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A tree stand comprising:

an upper climbing platform and a lower foot climbing aid; a generally rectangular shaped flat base with a secured telescopically collapsible compressive member; two angle members pivotally secured to said flat base and having a means thereon for securing to said flat base in either a generally upright angular working position or a collapsed position generally overlaying and parallel relative to said rectangular base, said collapsed position being a transporting; a telescopically adjustable tree encircling member secured to said angle members, said encircling member having a means thereon for securement in a plurality of positions dependant on the girth of a tree to be climbed; a seat frame assembly secured to said flat base and having a seat member secured to said seat frame, said seat member being capable of a complete 360 degree rotation relative to said seat frame assembly; said seat frame assembly capable of securing said seat member in either a generally upstanding elevated position or in a collapsed position generally flat and overlying said generally flat base; a standing platform secured to said flat base, said platform comprised of abrupted and raised apertures to increase traction between the users feet when said platform become wet; said tree stand permitting the user to sit on said rotating seat either in the raised working or flat position; and said standing platform permitting the user to stand thereon during its use.

2. A tree stand according to claim 1 wherein said generally rectangular flat base comprises two generally parallel main supporting elements, a telescopically collapsible generally "M" shaped tree compressive element collapsible within said supporting elements frontal distal ends, a frontal, central and rear crossmember having a means of securing to said main supporting elements wherein said securing means being realized by welded connections or any other appropriate means.

3. A tree stand according to claim 1 wherein said collapsible generally "M" shaped tree compressive element comprises two generally parallel legs of unequal length secured to the distal ends of a generally "V" shaped member, said unequal length legs distal ends are crimped to a generally round configuration to further ease telescopic installation into said receiving ends of said main supporting elements wherein said unequal legs and said supporting elements having apertures to secure an extended, working position or a collapsed position via locking pin assemblies secured to said distal ends of the main supporting elements.

4. A tree stand according to claim 1 wherein said seat member is comprised of a swivel seat frame and a seat backrest both having a generally "U" shaped configuration wherein said backrest having a means of pivotally securing to said seat frame, said backrest being smaller in width compared to said seat frame to allow backrest to collapse generally flat and within the boundaries of said swivel seat frame, said swivel seat frame having a means of securing a generally rectangular shaped upper seat platform, said platform having a means for pivotally securing to a lower seat frame allowing seat member to achieve complete 360 degree rotation about said supporting seat frame assembly.

5. A tree stand according to claim 1 wherein said angle members generally forward distal ends having a means of pivotally securing to said platforms via struts, said struts having a generally square cross-sectional area to increase said platforms strength and rigidity when said platforms assume the generally upright working positions.

6. A tree stand according to claim 1 wherein said angle members are secured to a contained slidable housing relative said platforms main members, said housings are capable of transversing said main members to either a forward position, generally adjacent to and between a fixed crossmember and a spring loaded detent pin in said generally upright working position or traveling generally rearward relative said forward position in the said generally flat transporting position.

7. A tree stand according to claim 1 wherein said platforms main structural components are generally comprised of a sutible Aluminum alloy material, said structural components having an appropriate means of securing one to another by either steel fasteners or welded connections.

8. A portable tree climbing aid comprising:
a generally rectangular shaped flat platform body; said platform body comprised of; two generally parallel side support elements, a frontal generally "V" shaped tree compressive crossmember, a generally "V" shaped compressive supporting crossmember, and standing platform supporting crossmembers; said crossmembers having a means of securing to said side supporting elements by generally a welded connection or any other appropriate means; said standing platform supporting crossmembers having a means thereon for securing a generally square shaped abrupted standing platform; said standing platform comprised of abrupted and raised apertures to increase traction between the users feet when said platform becomes wet; said standing platform having a means of securing a foot securing band at three generally equidistant locations at said standing platforms generally frontal edge; said platform body having a means of pivotally securing two angle elements at said angle elements rear distal ends to said side supporting elements outer, generally rear distal ends; each of said angle members having a means of pivotally securing a supporting strut at said angle members generally forward distal ends; said supporting strut having a means of pivotally securing to a slidable housing; said ridable housing having a means of securing a slidable connection between and not past said forward tree compressive element and said compressive supporting element therealong said side supporting elements; said slidable housing having a means of securing a position generally adjacent to and between said forward tree compressive element and a spring loaded detent pin; said angle members are secured in the generally upright working position when said slidable housing is secured adjacent to said forward tree compressive element via said detent pin; said angle members assume a generally flat, collapsed position relative said platform body when said slidable housing is positioned generally adjacent to said compressive supporting element; said collapsed position being a transporting position; a tree encircling member having a generally inverted "U" shape; said tree encircling members distal ends having a means of being telescopically receivable within said angle members generally forward distal ends; said encircling member having a means thereon for securement in a plurality of positions dependant on the size of the tree to be climbed.

9. A portable tree climbing aid according to claim 8 wherein said angle members generally forward distal ends are pivotally secured to a strut wherein said strut is also pivotally secured to a slidable housing, said slidable housing capable of moving therealong an enclosed main supporting member generally between and not past forward compressive and compressive supporting crossmembers, said angle member assumes either a generally upright working position whenever said slidable housing is secured between and adjacent to said compressive crossmember and a spring loaded detent pin or assumes the collapsed, generally flat transporting position whenever said slidable housing is slid back past depressed detent pin and slid rearward to a position generally adjacent to said compressive supporting crossmember.

10. A transportable and collapsible tree climbing apparatus comprising:
an upper seating platform and a lower climbing lid platform; a tree stand and climbing aid comprised of generally ridged, rectangular shaped flat platforms with readily collapsible angle members capable of securing said angle members in either a generally upright working position or a collapsed, generally flat position relative said platforms; said angle members having a means of telescopically receiving and securing a tree encircling member in a plurality of positions, one within the other, dependant on the size of the vertical structure to be climbed; said means of securing said tree encircling member in said plurality of positions being a locking pin assembly; said tree encircling member having distal ends offset and of unequal lengths; said unequal, offset lengths allow user to concentrate on inserting longer leg length of said tree encircling member into said receiving end of either angle member first, then following with inserting shorter leg into receiving end of second angle member independently of each other and not simultaneously; said tree stand and climbing aid having a means of pivotally securing said angle members distal ends wherein said angle members distal ends remain completely attached in either the said upright, working position, or the collapsed, transporting position to both said tree stand and said climbing aid; a pivotally secured strut wherein said strut is generally square in cross-section to increase said stand and said climbing aids stability and strength wherein said struts are pivotally secured and remain completely attached at said struts distal ends to either both said stand and said climbing aid in either said working position or said collapsed position; said angle members assume either an upright, secured working position or said transporting position by moving a pivotally attached, slidable housing; wherein said angle members are secured in said generally upright position by sliding said housing between a fixed crossmember and a spring loaded detent pin; said tree stand wherein said tree stand is equipped with a sufficient void or opening to allow user to place his or her legs threw to allow said user to climb a tree or vertical structure using the sit and stand method of tree climbing; said tree stand equipped with a seat frame assembly capable of assuming either a generally upright secured position, or a generally flat portable position; said seat frame assembly securing a seat assembly capable of complete 360 degree rotation relative said tree stand; said seat assembly having a backrest capable of assuming a generally upright working position or a generally flat, collapsible and overlying position relative said tree stand; wherein said tree stand and said climbing aid having a means of retaining all components completely secured and fastened in either said working or said transporting positions.

11. A transportable and collapsible tree climbing apparatus according to claim 10 said generally inverted "U" shaped tree encircling members legs are unequal and offset in length and equipped with a plurality of apertures to secure a plurality of settings based on the size of the tree to be climbed, said tree encircling members distal ends are crimped to a generally rounded configuration to further ease said telescopic insertion into said receiving ends of said angle members wherein said encircling member secures said settings via a biased locking pin assembly wherein said locking pin assemblies having a means of securing to said angle members telescopically receiving distal ends.

12. A transportable and collapsible tree climbing apparatus according to claim 10 wherein said seat assembly comprises a foldable backrest pivotally secured to a swivel seat frame, said swivel seat frame having a means of securing to an upper seating platform, said seat assembly supplied with a padded seat, said foldable backrest supplied with a securable padded enclosing "pocket" to allow operator to hold and secure desired articles in said pocket.

13. A transportable and collapsible tree climbing apparatus according to claim 10 wherein said locking pin assembly comprises a locking pin with an upper and lower depression having a generally "T" shape and a secured bushing with a groove and an aperture to secure a spring loaded ball, said spring loaded ball is biased to secure said pin via said depressions in either the upper released or lower working position wherein said pins travel is limited to the extents of said upper and lower pin depressions.

14. A transportable and collapsible tree climbing apparatus according to claim 10 wherein said locking pin assembly having a means of securing to said receiving generally frontal distal ends of said angle members and said platforms main members wherein said members are equipped with thru holes to allow said pin to secure said tree encircling members and said tree compressive member in a plurality of positions, a locking pin assembly wherein the components of said assembly remain securely attached to said assembly in either the working or the released position.

15. A transportable and collapsible tree climbing apparatus according to claim 10 wherein said tree climbing apparatus comprises an upper seating platform with an elevated rotatable seat and a lower climbing aid, members of said tree climbing apparatus are capable of collapsing generally flat and in overall length relative to said platforms to facilitate a transporting position, said tree climbing apparatus utilizes the "sit & stand" method of tree climbing.

16. A transportable and collapsible tree climbing apparatus according to claim 10 wherein said members comprising said apparatus remain completely connected to said platforms in either the generally flat collapsed transporting position or the generally upright working position.

17. A transportable and collapsible tree climbing apparatus according to claim 10 wherein each of said angle members generally rear distal ends of said upper seating platform are pivotally secured to a slidable housing, said slidable housing capable of moving therealong an enclosed main supporting member generally between and not past the central rear crossmember and rear crossmember, said angle members assumes either a secured generally upright working position when said pivotally attached slidable housing is secured adjacent to and between said central rear crossmember and a spring loaded detent pin or assumes a generally collapsed transporting position when said slidable housing is slid back past depressed detent pin and slid rearward to a position generally adjacent to rear crossmember.

18. A tree stand comprising:

a collapsible seat and seat supporting assembly wherein said seat having a means of complete 360 degree rotation relative said seat supporting assembly; said seat supporting assembly comprised of a generally inverted "U" shaped frontal and rear supporting element wherein said frontal and rear supporting elements having a means of pivotally securing their distal ends to the frontal and central crossmembers respectfully via secured tabs; said frontal supporting element being sufficiently less in width than said rear supporting element to allow said frontal element to collapse within the boundaries of said rear supporting element; two supporting struts generally "⌒" shaped and having a means of pivotally securing said struts generally frontal distal ends to said frontal crossmember generally adjacent to said frontal supporting elements outer distal ends; said supporting struts having a means of pivotally securing said struts generally rear distal ends each to a tubular slide; said tubular slides having sufficient diameter to allow said slide to travel therealong said rear supporting elements generally parallel legs; said rear supporting element having a means of securing said tubular slides in a generally raised, upstanding position via spring loaded detent pins; said detent pins biased thru apertures in said generally parallel leg sections of rear supporting element and detent receiving apertures in said tubular slides; a generally flat lower seat platform having a means of securing two tubular elements at said platforms generally frontal and rear edges; said secured tubular elements having a means for rotatably securing to said frontal and rear supporting elements generally horizontal, central sections; said lower seat platform having a means for pivotally securing said rotatable seat assembly; said lower seat platform and said seat assembly spaced with plastic type washers to reduce noise when said seat assembly rotates about said lower platform; said seat supporting assembly capable of securing a generally elevated, upstanding, working position when operator pulls said seat or seat frame assembly generally forward and upward securing said tubular slides in said raised, upstanding position via said biased detent pins; said seat and seat frame assembly capable of collapsing generally flat relative the generally flat rectangular tree stand base when said tubular slides are released from said spring loaded detent pins and allow said tubular slides to travel generally downward therealong toward said rear supporting elements lower distal ends.

19. A tree stand according to claim 18 wherein said backrest is secured in an upright working position by a single length of wire or cable wherein said cable length having a means of securing to said swivel seat frame at said wire lengths distal ends wherein said wire length is secured within said backrest frame thru two apertures therealong, said backrest is capable of collapsing generally flat within the boundary of said swivel seat frame in the transporting position.

20. A tree stand according to claim 18 wherein said seat and said seat frame assembly can secure a generally vertical working position when the operator pulls either said seat assembly or said seat frame generally forward and allows said assemblies to rotate from the collapsed generally flat position to said upright working position, said seat and seat frame assemblies are secured in said upright working position when the operator aligns and allows said spring loaded detent pins to extend thru apertures in said slidable tubular elements.

21. A tree stand according to claim 18 wherein said seat supporting assembly is generally located in the middle third section of said generally flat rectangular tree stand base when said seat frame supporting assembly is in said upright working position, said location of said supporting frame allows the operator complete unimpeded rotating capabilities and increases the binding torque which secures the tree stand to the tree when the operator elects to sit on said rotatable seat.

* * * * *